(12) United States Patent
Hama

(10) Patent No.: US 7,072,346 B2
(45) Date of Patent: Jul. 4, 2006

(54) NETWORK AND EDGE ROUTER

(75) Inventor: Daisuke Hama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 735 days.

(21) Appl. No.: 09/805,868

(22) Filed: Mar. 14, 2001

(65) Prior Publication Data
US 2004/0202171 A1  Oct. 14, 2004

(30) Foreign Application Priority Data
Nov. 27, 2000  (JP) ............... 2000-359296

(51) Int. Cl.
*H04L 12/28* (2006.01)

(52) U.S. Cl. .................. 370/395.53; 370/389

(58) Field of Classification Search ........ 370/389–392, 370/400–402, 411–412, 395.1–395.5, 395.53, 370/466; 709/230, 243, 238
See application file for complete search history.

(56) References Cited

U.S. PATENT DOCUMENTS

| | | | | |
|---|---|---|---|---|
| 6,205,488 B1* | 3/2001 | Casey et al. | ................ | 709/238 |
| 6,339,595 B1* | 1/2002 | Rekhter et al. | ............. | 370/392 |
| 6,633,571 B1* | 10/2003 | Sakamoto et al. | .......... | 370/401 |
| 6,647,428 B1* | 11/2003 | Bannai et al. | ............. | 370/389 |
| 6,674,760 B1* | 1/2004 | Walrand et al. | ............. | 370/392 |
| 6,757,298 B1* | 6/2004 | Burns et al. | ........... | 370/395.53 |
| 6,771,662 B1* | 8/2004 | Miki et al. | ................. | 370/469 |
| 6,788,681 B1* | 9/2004 | Hurren et al. | .............. | 370/389 |
| 2001/0049739 A1* | 12/2001 | Wakayama et al. | ......... | 709/230 |
| 2003/0088699 A1* | 5/2003 | Luciani et al. | ............. | 709/243 |

FOREIGN PATENT DOCUMENTS

JP  09130421  5/1997
JP  10145411  5/1998

OTHER PUBLICATIONS

Rosen, E., BGP/MPLS VPNs, Mar. 1999, RFC, pp. 1-25.*
Haeryong Lee, End to End QOS Architecture for VPNs: MPLS VPN deployment in a Backbone Network, Aug. 2000, IEEE, pp. 479-483.*
River Stone Networks Inc.; http://www.riverstonenet.com/pdf/tls_pres.pdf "MPLS based Transparent LAN services" Copyright 2001.

* cited by examiner

*Primary Examiner*—Steven Nguyen
(74) *Attorney, Agent, or Firm*—Katten Muchin Rosenman LLP

(57) ABSTRACT

In network for forming a VPN on a shared network and communicating via the VPN, a core network of the VPN is formed by an MPLS network, access networks for accessing the core network are formed by VLANs, and edge routers are provided between the MPLS network and VLANs for interfacing the MPLS network and the VLANs. A transmit-side edge router converts a packet, which enters from a VLAN, to an MPLS packet and transmits this MPLS packet to the MPLS network, A receive-side edge router converts the MPLS packet, which has been received from the MPLS network, to a VLAN packet and directs the VLAN packet to a VLAN that belongs to the same VPN as that of a VLAN on the transmit side.

7 Claims, 25 Drawing Sheets

VLAN PACKET: ···IP | TYPE | TAG | SOURCE MAC | DESTINATION MAC

→

MPLS PACKET: ···IP | VPN LABEL | FORWARDING LABEL | TYPE | SOURCE MAC | DESTINATION MAC

SWAP

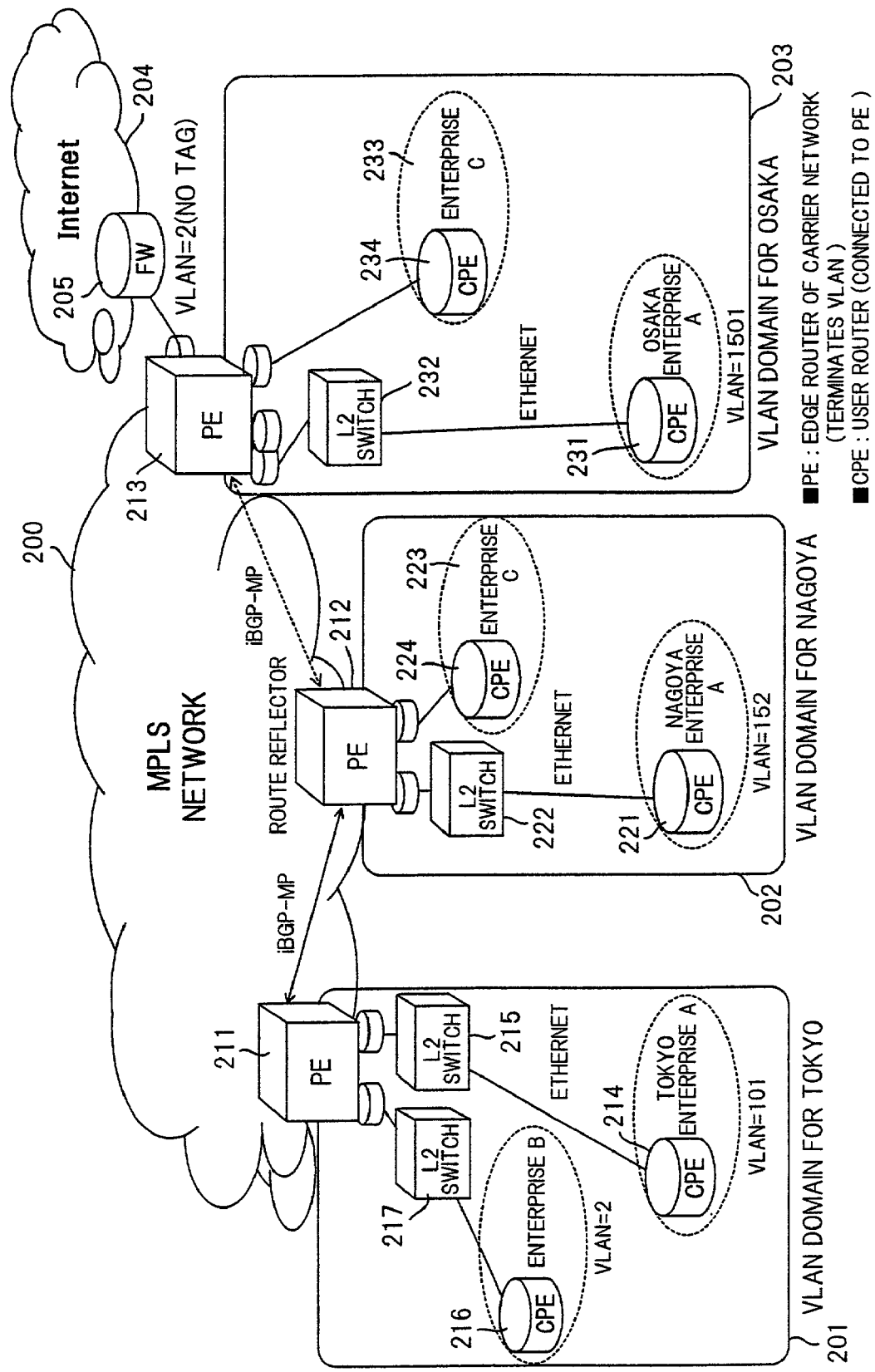

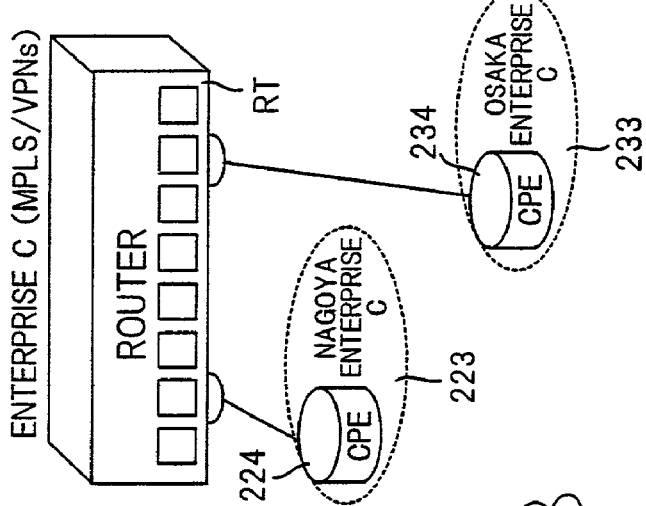
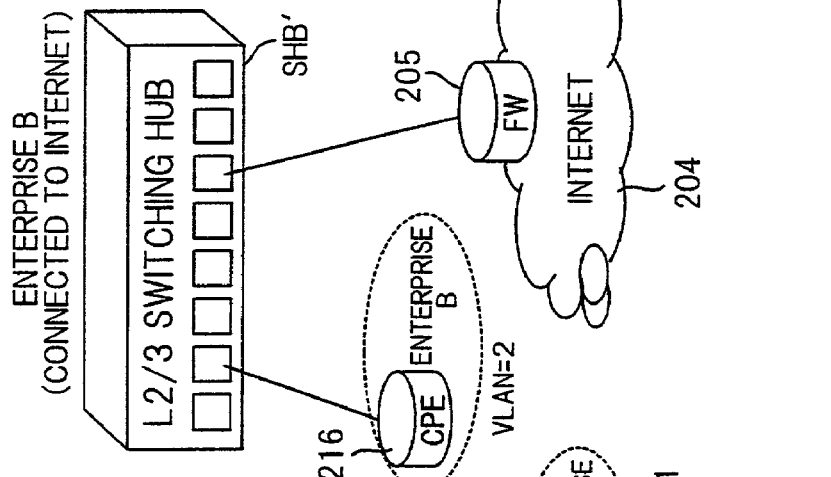
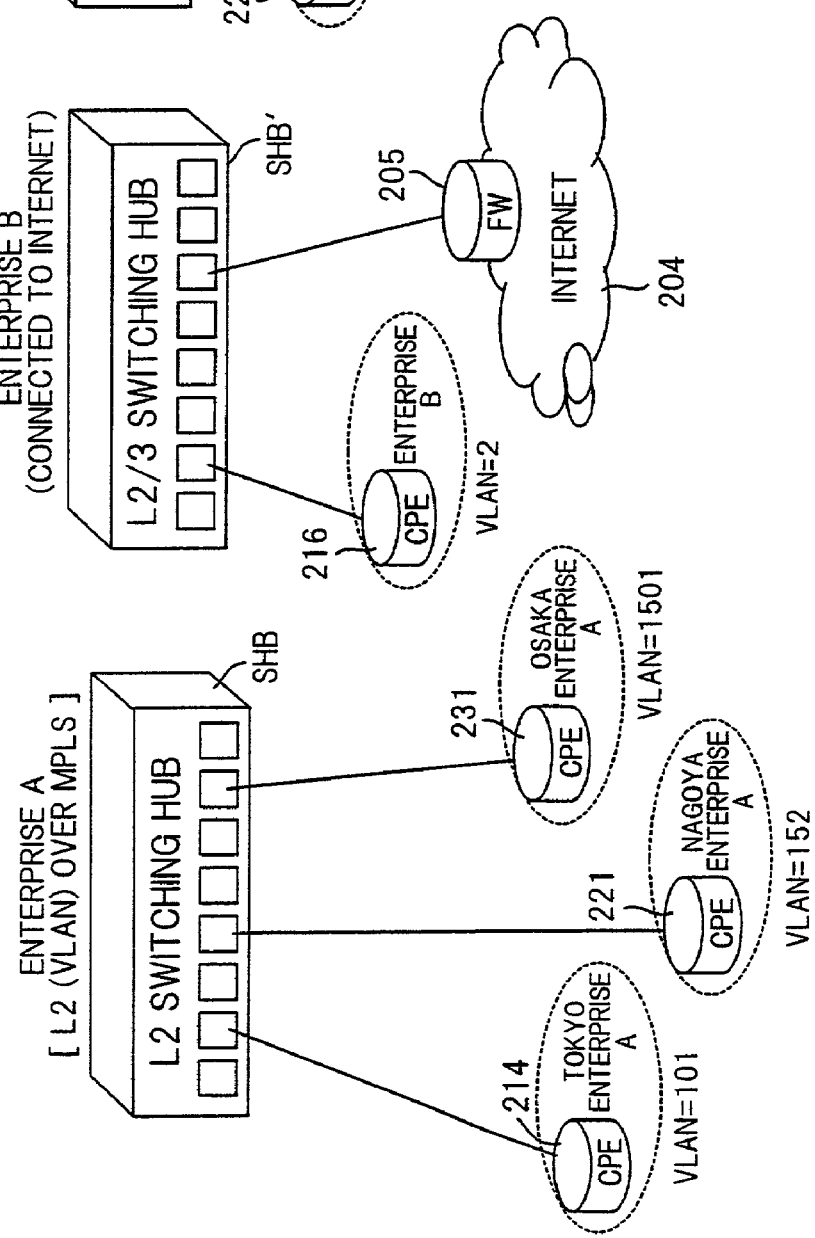

FIG. 11A

VPN TABLE OF ENTERPRISE A IN PE A

| L2 VPN LABEL TABLE OF ENTERPRISE A | | | | |
|---|---|---|---|---|
| VPN LABLE | OUTGOING I/F | MAC | VID | VPNi |
| 26 | ETHERNET | MAC A | 101 | COMPANY A |

| L2 VPN ROUTING TABLE OF ENTERPRISE A | | |
|---|---|---|
| L2 | MAC B | LOOPBACK ADDRESS OF PE B; VIAN 152 |
| L2 | MAC C | LOOPBACK ADDRESS OF PE C; VLAN 1501 |
| L2 | MAC A | DIRECTLY CONNECTED, ETHERNET, VLAN101 |

FIG. 11B

VPN TABLE OF ENTERPRISE B IN PE B

| L2 VPN LABEL TABLE OF ENTERPRISE A | | | | |
|---|---|---|---|---|
| VPN LABLE | OUTGOING I/F | MAC | VID | VPNi |
| 26 | ETHERNET | MAC B | 152 | COMPANY A |

| L2 VPN TABLE OF ENTERPRISE A | | |
|---|---|---|
| L2 | MAC B | DIRECTLY CONNECTED, ETHERNET, VLAN 152 |
| L2 | MAC C | LOOPBACK ADDRESS OF PE C; VLAN 1501 |
| L2 | MAC A | LOOPBACK ADDRESS OF PE A; VLAN101 |

FIG. 11C

VPN TABLE OF ENTERPRISE C IN PE C

| L2 VPN LABEL TABLE OF ENTERPRISE A | | | | |
|---|---|---|---|---|
| VPN LABLE | OUTGOING I/F | MAC | VID | VPNi |
| 26 | ETHERNET | MAC C | 1501 | COMPANY A |

| L2 VPN LABEL TABLE OF ENTERPRISE A | | |
|---|---|---|
| L2 | MAC B | LOOPBACK ADDRESS OF PE B; VLAN152 |
| L2 | MAC C | DIRECTLY CONNECTED, ETHERNET, VLAN1501 |
| L2 | MAC A | LOOPBACK ADDRESS OF PE A; VLAN101 |

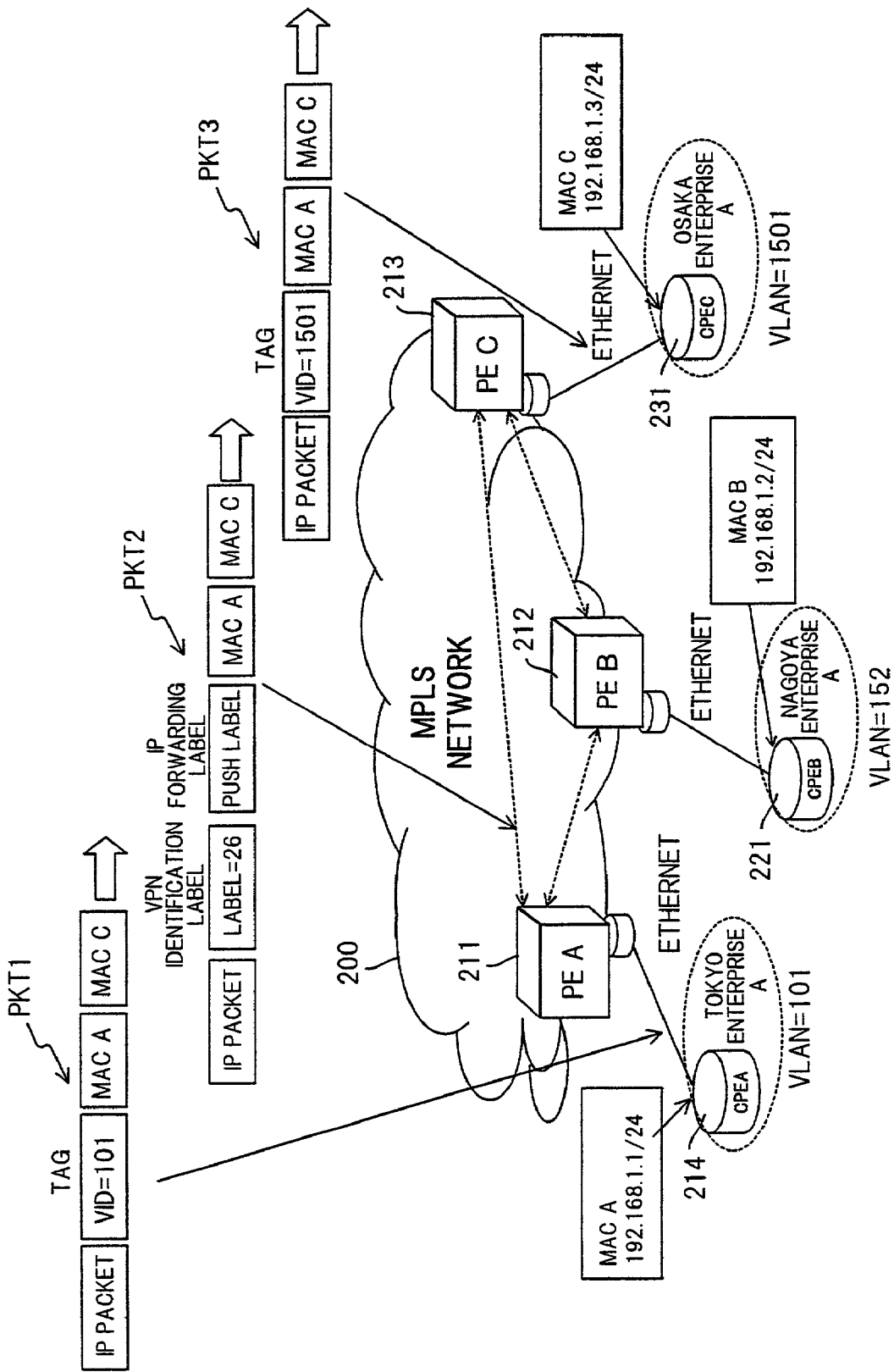

NETWORK AND EDGE ROUTER

BACKGROUND OF THE INVENTION

This invention relates to a network and to an edge router. More particularly, the invention relates to a network for forming a VPN (Virtual Private Network) on a shared network and communicating over the VPN, and to an edge router in a network for forming a VPN on a shared network, forming a core network of the VPN by a label switching network and forming an access network, which is for accessing the core network, by a VLAN (Virtual LAN).

In order to construct a network (an intranet) within an enterprise, it is necessary to interconnect the home office, business offices, branches, factories and research labs, etc., scattered over a number of areas. With the age of internationalization upon us, there is a need for intranets that are connected widely to business sites overseas without being closed solely within one's own country. When an intranet is thus spread over a wide area, it becomes necessary to implement the same system environment at both the home and remote offices. VPNs (Virtual Private Networks) have been developed and adopted widely for this purpose. A VPN is a virtual private network that can be set up on a shared network (a wide-area network such as the Internet) and can be utilized without the user being aware of the fact that the shared network is being utilized. A VPN is constructed on a wide-area network (WAN) utilizing an access server, a WAN router and a VPN-dedicated devices. Techniques for constructing a VPN include a method using a VLAN (Virtual LAN) in accordance with IEEE 802.1Q, a method based upon IPsec and a method using MPLS (MultiProtocol Label Switching), etc.

VLANs form network-connected devices into groups without relation to their physical wiring and constructions, and each group is formed within an area that is reached by Layer-2 MAC frames. The sending and receiving of frames is performed within the same group and the broadcasting of frames also takes place within the same group. Communication with a different VLAN group general requires the intermediary of a router having a relay function in Layer 3.

Schemes for implementing a VLAN include (1) port-based VLAN, (2) MAC-address database VLAN and (3) policy-based VLAN. Among these, port-based VLAN is a scheme for forming a VLAN group statically on a switching hub on a per-physical-port basis. MAC-address database VLAN is a scheme which forms a VLAN group based upon MAC addresses possessed by terminals. The pertinent VLAN group is recognized based upon the MAC address of the originating source contained in a received packet.

FIG. 18 shows an example of the structure of port-based VLAN according to the prior art. Here terminals such as personal computers are connected to respective ones of a plurality of LAN ports P1 to P6 of a switching hub SHB. The LAN ports P1 to P3 belong to group 1 and the LAN ports P3 to P6 belong to group 2. Broadcast frames transmitted from terminals in group 1 are broadcast only to terminals in group 1, and broadcast frames transmitted from terminals in group 2 are broadcast only to terminals in group 2. The sending and receiving of frames is performed only within the same group, and communication between the different groups 1, 2 requires the intervention of a router, not shown. Prior to grouping, broadcast frames needed to be relayed to all terminals. By grouping, however, broadcast frames now need only be relayed within the group. This makes it possible to alleviate the load on the network. Moreover, since a frame is not transmitted from one group to another, security can be maintained.

A VLAN can be designed in such a manner that a LAN port is placed in multiple groups, as is the case with LAN port P3 in FIG. 19. Further, grouping is not limited to a single switching hub. As shown in FIG. 19, it is possible to group ports belonging to a plurality of switching hubs SHB1 to SHB3. More specifically, ports P1 to P3 of each of the switching hubs SHB1 to SHB3 are grouped, a VLAN ID (VID: Virtual LAN Identifier) specific to each group is assigned to each group, and a tagging scheme described below is adopted to construct a plurality of VLANs (VLAN1 to VLAN3) that bridge a plurality of devices. As a result of this arrangement, terminals belonging to the same VLAN can communicate with one another, regardless of where they are installed, just as if they were connected to the same physical network.

The tagging scheme mentioned above is a technique standardized by IEEE 802.1Q. In accordance with tagging, a VID is assigned to a MAC frame in the manner of a tag. The tag is carried with the MAC frame along with the packet. An L2 switch (switching hub) that has received a tagged MAC frame analyzes the content of the tag and relays the frame to the appropriate port belonging to the VLAN.

FIG. 20 illustrates the format of a MAC frame in a VLAN (compliant with IEEE 802.1Q) according to the prior art. Here M1 represents a MAC destination address (MAC DA); M2 a MAC source address (MAC SA); M3 a tag; M4 type; and M5 an IP packet (composed of an IP header, TCP header and data field). The tag M3 consists of four bytes and has (1) a TPID (Tag Protocol Identifier), (2) user priority, (3) a CFI (Canonical Format Indicator), (4) a VID (Virtual LAN Identifier), (5) length and (6) an RIF (Routing Information Field). The value of TPID, which is a hexadecimal number, is fixed at 81-00 (IEEE 802.1Q tag type). User priority expresses the order of priority of the frame using three bits. The CFI indicates the absence or presence of an RIF in the tag header. The VID is a 12-bit virtual-LAN identifier; a total of $2^{12}$=4096 VIDs can be specified.

FIG. 21 illustrates an example of VLAN implementation according to the prior art. Shown in FIG. 21 are a first switching hub SHB1 in which personal computer terminals PC1, PC2 are connected to ports P1, P2, respectively; a second switching hub SHB2 in which personal computer terminals PC3, PC4 are connected to ports P1, P2, respectively; a third switching hub SHB3 in which the first and second switching hubs SHB1, SHB2 are connected to ports P1, P2, respectively; and a router RT connected to port P3 of the third switching hub SHB3. The first and second switching hubs SHB1, SHB2 are connected to the third switching hub SHB3 via their respective ports P3.

The first and third personal computer terminals PC1, PC3 construct a first VLAN (VID=10), the second and fourth personal computer terminals PC2, PC4 construct a second VLAN (VID=20), and the ports P1 to P3 of each of the first switching hubs SHB1 to SHB3 are grouped as indicated by the VID values in FIG. 21. The ports having two VID values each belong to two groups. In an instance where the personal computer terminal PC1 transmits a packet to the personal computer terminal PC3, the personal computer terminal PC1 transmits a packet having the MAC address of the personal computer terminal PC3 placed in its header as the destination address. Upon receiving this packet at port P1, the first switching hub SHB1 finds the VID (=10) of the VLAN to which the port P1 belongs from a predetermined table, assigns a tag inclusive of VD=10 to the received packet and transmits the packet from port P3 of VID=10. The tagged packet is then transmitted to the second switching hub SHB2 via the ports P1, P2 of third switching hub SHB3. When the tagged packet arrives at the second switching hub SHB2, the latter removes the tag and transmits the packet to the personal computer terminal PC3 from port P1 (VID=10).

On the other hand, if the personal computer terminal PC1 transmits a packet to the personal computer terminal PC4 in the other group, the personal computer terminal PC1 transmits a packet having the MAC address (Layer-2 address) of the router RT placed in its Layer-2 header as the destination address and having a Layer-3 address (IP address) of the personal computer terminal PC4 placed in its Layer-3 header (IP header). Upon receiving this packet at port P1, the first switching hub SHB1 finds the VID (=10) of the VLAN to which the port P1 belongs from the table, assigns a tag inclusive of VD=10 to the received packet and transmits the packet from port P3 of VID=10. The third switching hub SHB3 transmits the received packet as is from its port P3 of VID=10. Upon receiving the packet, the router RT changes the VID value from 10 to 20 and changes the destination MAC address of the packet to the MAC address of the personal computer terminal PC4 by referring to the Layer-3 address of the destination and then transmits the packet from its port P1. The tagged packet is then transmitted to the second switching hub SHB2 via the ports P3, P2 of the third switching hub SHB3.

In accordance with the above-described VLAN, the foundation for next-generation LANs can be constructed flexibly while preserving the existing assets of an enterprise information system (intranet), and it is possible to achieve streamlining by integrating network administration and operation.

A method based upon MPLS (MultiProtocol Label Switching) is available as a method of constructing a VPN. MPLS is a protocol that introduces the concept of a path (a virtual communication path) into an IP network where the concept of a connection does not exist. The MPLS network adds a new field "label", which is for identifying the connection, onto an IP packet, and the network router transmits the IP packet upon popping, pushing or swapping the label value of the "label" field. In accordance with MPLS, an IP connection-type service can be provided. Moreover, security can be assured on a per-connection basis and an IP private-line service, which serves as a substitute for a private line, can be provided efficiently by an IP network. This is a method having a very high degree of scalability. Further, a method of constructing a VPN using MPLS has been disclosed as RFC 2547BGP/MPLS VPNs. An IP VPN can be constructed on the Internet by this RFC method.

MPLS is situated intermediate Layer 2 and the IP layer. An ordinary router executes forwarding processing by referring to the IP header of an IP packet. However, a router which supports MPLS executes forwarding based upon the label provided between the IP header and L2 header without referring to the IP header.

FIG. 22 is a diagram useful in describing MPLS. Routers for MPLS are indicated at numerals 1 to 5. MPLS routers 1 and 5 constitute edge routers for making a connection to the outside of the MPLS network, and MPLS routers 2 to 4 constitute core routers within the MPLS network. A terminal device on the transmitting side is connected to the edge router 1 via a LAN or the like, and a terminal device at the destination having an IP address 10.1.100.0/24 is connected to the edge router 5 via a router and a LAN. If the two terminal devices are to communicate, an LSP (Label Switched Path) is set up between the edge routers 1, 5, to which the terminals are connected, in accordance with an LDP (Label Distribution Protocol) and through use of a label, and label tables 1a to 4a are formed in the MPLS routers 1 to 4, respectively, that form this LSP.

If a MAC frame containing an IP packet enters from a terminal device on the transmitting side under these conditions, the edge router 1 refers to the table 1a, attaches a shim header (described later), which is the MPLS header, to the MAC frame, attaches (pushes) "39", which serves as the label, to the label field of the shim header, and then directs the frame to the next MPLS router 2. The latter refers to the table 2a, swaps label "37" for label "39" and then directs the frame to the next MPLS router 3. The latter refers to the table 3a, swaps label "36" for label "37" and then directs the frame to the next MPLS router 4. The latter refers to the table 4a, finds a label "pop" that conforms to the label "36", nulls (pops) this label and then directs the frame to the next router 5. Upon receiving the frame having the null label, the edge router 5 removes the shim header of the MPLS from the MAC frame and directs the frame to the terminal device at the destination.

An LSR (Label Switching Router), which is a router for MPLS, is arranged to decide a route upon referring to IP-layer route information, such as routing table information, and to affix a label to this route. In other words, an LSR generates a label path automatically, in accordance with the LDP (Label Distribution Protocol), along a route decided by the IP routing protocol (IS-IS, OSPF, etc.).

FIG. 23 is a diagram useful in describing the manner in which a label path is set up. The MPLS router (LSR) 5, which is the edge router on the side of the destination terminal device, finds the upstream MPLS router (LSP) 4 in the direction of the MPLS router (LSR) 1 on the transmitting side using a routing protocol such as OSPF (Open Shortest Path First), requests the MPLS router (LSP) 4 to null the label and to then transmit the frame, and sends the IP address (=10.1.100.0/24) of the destination terminal device.

As a result, the MPLS router (LSP) 4 finds the available label value (=36), finds the MPLS router (LSP) 3 in the direction of the MPLS router (LSR) 1 on the transmitting side using the routing protocol, requests the MPLS router (LSP) 3 to make the label "36"and to then transmit the frame, and sends the IP address (=10.1.100.0/24) of the destination terminal device. The MPLS router (LSP) 4 creates the label table 4a. The latter includes (1) the local label (=36), (2) the outgoing label (=pop label), (3) a prefix (=10.1.100.0/24), (4) an outgoing interface (=Ethernet 6) for interfacing the MPLS router (LSR) 5, and (5) next hop [=the IP address of the MPLS router (LSR) 5]. The MPLS router (LSR) 3 and the MPLS router (LSR) 2 similarly create the label tables 3a, 2a, respectively, and the MPLS router (LSR) 1, which is the edge router, creates the label table 1a.

If under these conditions a MAC frame having an IP packet the destination IP address of which is 10.1.100.0/24 enters the edge router 1 from the terminal on the transmitting side, the MPLS header is assigned to the frame, the frame is transmitted over the MPLS network while the label value of the label field is pushed, swapped and popped, and the frame is transmitted to the destination terminal device upon having its MPLS header removed by the edge router 5a, as described above in conjunction with FIG. 22.

FIG. 24 is a diagram useful in describing the structure of a shim header, which is the MPLS header, and the position at which the shim header is inserted into a Layer-2 frame (MAC frame). Characters M1, M2, M4 and M5 in FIG. 24 represent a MAC destination address (MAC DA), a MAC source address (MAC SA), type and IP packet (IP header, TCP header, data), respectively. A shim header M6 is inserted between the Layer-2 header and the IP header. The shim header M6 has a 20-bit label field, a 3-bit EXP field, a 1-bit S field and an 8-bit TTL field.

With MPLS, shim headers can be stacked and such stacking makes it possible to construct a VPN. More specifically, as shown in (A) of FIG. 25, two shim headers M6, M7 are forwarded upon being stacked in one IP frame. As shown in (B) of FIG. 25, the label (Layer-1 label) of the first shim header M6 is used for forwarding within the MPLS network, and the label (Layer-2 label) of the second shim header M7 is used to identify the VPN line connected to the edge routers 1 and 5. That is, the second label is used for VPN identification. The second label can also be used to identify the user line.

FIG. 26 is a diagram useful in describing MPLS/VPN for implementing an IP-VPN by stacking two labels in accordance with the prior art. Here it is assumed that the user of a VPN A communicates via the edge routers 1 and 5. The edge routers 1, 5 assign VPN-IDs (VPN identifiers) per individual user-line interfaces beforehand. In FIG. 26, the edge router 1 assigns a VPN-ID of 13 to a network address 192.168.0. X possessed by the VPN-A site, and the edge router 5 assigns a VPN-ID of 13 to a network address 192.168.1. X possessed by the VPN-A site and assigns a VPN-ID of 14 to a network address ZZZ.ZZZ.Z.Z possessed by a VPN-V site.

Next, in accordance with an iBGP (interior Border Gateway Protocol), the edge router 5 on the receiving side reports the label information to the edge router 1 on the transmitting side per combination of VPN-ID and network address. The iBGP is a protocol for exchanging route information and the like over a TCP connection. The routers situated at the edge of the MPLS network send and receive VPN information to and from each other without the intervention of a core router. In the illustrated example, the edge router 5 on the receiving side uses iBGP to notify the edge router 1 on the transmitting side that the label of "192.168.1. X, VPN-ID=13" is "3" and that the label of "ZZZ.ZZZ.Z.Z, VPN-ID=14" is "4". On the basis of this information, the edge router 1 creates label tables 1a, 1b on a per-VPN-ID basis.

In concurrence with the foregoing, each MPLS router sets up a label table for forwarding the packet within the MPLS network by the LDP (Label Distribution Protocol), as described above in connection with FIGS. 22 and 23. As a result, "5" is reported from the core router 2 to the edge router 1 as the label for MPLS forwarding of the destination 192.168.1. X, "5" is reported as the label for MPLS forwarding of the destination ZZZ.ZZZ.Z.Z and these are added to the label tables 1a, 1b.

If an IP packet enters from the user site (transmission source VPN-ID=13) of VPN A under conditions in which the table 1a has been created as set forth above, the edge router 1 refers to the table 1a based upon the transmission source VPN=13 and destination address 192.168.1. X, finds the label (=3) for VPN identification and the label (=5) for MPLS forwarding, attaches these two labels to the packet and transmits the packet to the core router 2. The latter refers to the label (=5) for MPLS forwarding and executes forwarding processing. If the packet arrives, the edge router 1 on the receiving side refers to the label (=3) for VPN identification, determines that the VPN is VPN A, removes the label and sends the packet only to the user site of VPN A.

It should be noted that the foregoing is an example in which two label tables are provided. In actuality, edge routers are provided with tables the number of which is equivalent to the number of source VPN-IDs and each table holds VPN identification labels and MPLS forwarding labels mapped to combinations of transmission source VPN-IDs and destination IP addresses.

FIG. 27 is a diagram useful in describing MPLS/VPNs according to the prior art. This is an example in which an MPLS network is constructed by the network of a communications provider. Shown in FIG. 27 are an MPLS network 11 belonging to the provider, provider edge routers (PE routers) 12, 13, 14 situated at the edge of the MPLS network, core routers 15 to 18 situated with in the MPLS network, customer systems (intranets) 21 to 24, and customer edge routers (CE routers) 25 to 28 situated at the edges of the customer systems. The PE routers 12 to 14 are routers which support Layer-2 MPLS and are VPN-aware. The PE router on the transmitting side adds a VPN identification label (VPN-ID) and an MPLS forwarding label, which have been set in a table beforehand, to a packet that enters from the CE router. Upon receiving this packet, the PE router on the receiving side sends the packet to the customer system that corresponds to the VPN identification label (VPN-ID). In the example of FIG. 27, the VPN A is formed by the customer systems 21, 22 and the VPN B is formed by the customer systems 23, 24. Accordingly, the terminal devices of each customer system in VPN A can access only the terminal devices in VPN A and cannot access the terminal devices in VPN B. Similarly, the terminal devices in VPN B can access only the terminal devices in VPN B.

Thus, if the same VPN-ID is assigned only to the same enterprise group, it is possible to construct an IP-VPN in which this group will not be accessed from another enterprise group and cannot transmit data to another enterprise group. Hence, the IP-VPN is closed within the same enterprise group.

The VLAN-based method of constructing a VPN is advantageous in that a VPN can be constructed easily and with little investment in equipment by assigning a unique VID to each customer on the network. However, the VID field is a maximum of 12 bits, meaning that only 4096 VIDs can be set if this is expressed as a decimal number. As a consequence, if users requesting VIDs in 1excess of 4096 appear, the system will no longer be able to cope, it will not be possible to meet the demand for networks of larger scale and scalability will be inadequate.

With the MPLS-based method of constructing a VPN, on the other hand, the label area expressing the VPN identifier is composed of 20 bits. This is advantageous in that as compared with VLAN-based construction, many more VPNs can be set up, it will be possible to cope with the growth of the Internet and greater scalability can be provided. However, with the MPLS-based method of constructing a VPN, a costly MPLS-capable router must be installed close to the user and it is necessary that one port of an edge router be prepared for the user. The problem which arises is a very large investment for equipment.

SUMMARY OF THE INVENTION

Accordingly, an object of the present invention is to provide an inexpensive, highly scalable VPN in a network by constructing access networks using VLAN-compatible switchs, and constructing a core network using MPLS-compatible routers.

Another object of the present invention is to provide an inexpensive, highly scalable VPN by providing interfaces between VLANs and an MPLS network to make it possible for the VLANs and MPLS network to coexist, and arranging it so that a transition can be made from a VLAN to the MPLS network with ease.

Yet another object of the present invention is to provide an inexpensive, highly scalable VPN by using VLAN-compatible switchs in the access system of each area and constructing an MPLS-based VPN on a WAN between areas.

A further object of the present invention is to provide an environment in which a user is capable of utilizing protocols other than IP, namely protocols such as IPX, FNA and AppleTalk, when a VPN is constructed.

In accordance with a first aspect of the present invention, the foregoing objects are attained by providing a network for forming a VPN on a shared network and communicating via the VPN, characterized by forming a core network of the VPN by a label switching network, forming an access network, which is for accessing the core network, by a VLAN, and providing an edge of the label switching network with an interface device which implements an interface function for interfacing the label switching network and the VLAN.

The interface device in this network can be constructed by an edge router provided on an edge of an MPLS network. An edge router on a transmitting side converts a packet, which is sent from the VLAN, to an MPLS packet and transmits the packet to the MPLS network, which is the label switching network. An edge router on the receiving side converts the MPLS packet, which has been received from the MPLS network, to a VLAN packet and transmits the VLAN packet in the direction of a VLAN that belongs to the same VPN as that of a VLAN on the transmitting side.

More specifically, each edge router has a table for storing correspondence between VLAN identifiers (VIDs) contained in VLAN packets and VPN identifiers (VPN labels) contained in MPLS packets, the edge router on the transmitting side finds a VPN label that corresponds to the VID of a VLAN packet, generates an MPLS packet having this VPN label and sends this MPLS packet to the MPLS network, and the edge router on the receiving side finds a VID that corresponds to a VPN label contained in an MPLS packet received from the MPLS network, generates a VLAN packet having this VID and sends this VLAN packet to the VLAN indicated by the VID. Further, the edge router has a route decision unit for deciding a route along which an MPLS packet is sent in the direction of the edge router on the receiving side, and a label table for storing a forwarding label, which specifies the path decided by the route decision unit, mapped to an address of the edge router on the receiving side, wherein the edge router on the transmitting side finds a receive edge router corresponding to a destination MAC address of a packet, finds a forwarding label that corresponds to the receive edge router from this label table, generates an MPLS packet that contains the VPN label and the forwarding label and sends this MPLS packet to the MPLS network.

In accordance with a second aspect of the present invention, the foregoing objects are attained by providing an edge router in a network for forming a VPN on a shared network, forming a core network of the VPN by an MPLS network and forming an access network, which is for accessing the core network, by a VLAN, wherein a transmit-side edge router comprises: (1) means for storing a corresponding relationship between VLAN identifiers (VIDs) and VPN labels, which are VPN identifiers; and (2) an MPLS packet generating unit for finding a VPN label corresponding to a VID, which is contained in a packet sent from the VLAN, using the corresponding relationship, generating an MPLS packet that includes this VPN label and sending this MPLS packet to the MPLS network. The transmit-side edge router further comprises: (3) a route decision unit for deciding a route along which an MPLS packet is sent in the direction of a receive-side edge router; and (4) a forwarding label storage unit for storing a forwarding label, which specifies the route decided by the route decision unit, mapped to the receive-side edge router; wherein the MPLS packet generating unit finds a receive-side edge router corresponding to a destination MAC address of a packet, finds a forwarding label that corresponds to the receive-side edge router from the forwarding label storage unit, and generates an MPLS packet that contains the VPN label and the forwarding label.

Further, in accordance with a third aspect of the present invention, the foregoing objects are attained by providing an edge router in a network for forming a VPN on a shared network, forming a core network of the VPN by an MPLS network and forming an access network, which is for accessing the core network, by a VLAN, wherein a receive-side edge router comprises: (1) a table for storing correspondence between VLAN identifiers (VIDs) and VPN labels, which are VPN identifiers; and (2) a VLAN packet generating unit for finding a VID corresponding to a VPN label, which is contained in a packet that enters from the MPLS network, using the table, generating a VLAN packet that includes this VID, and sending this VLAN packet to the MPLS network.

Further, in accordance with a fourth aspect of the present invention, the foregoing objects are attained by providing an edge router in a network for forming a VPN on a shared network, forming a core network of the VPN by an MPLS network and forming an access network, which is for accessing the core network, by a VLAN, the edge router comprising: (1) a table for storing correspondence between VLAN identifiers (VIDs) and VPN labels, which are VPN identifiers; (2) an MPLS packet generating unit for finding a VPN label corresponding to a VID, which is contained in a packet that enters from the VLAN, using the table, generating an MPLS packet that includes this VPN label and sending this MPLS packet to the MPLS network; and (3) a VLAN packet generating unit for finding a VID corresponding to a VPN label, which is contained in a packet that enters from the MPLS network, using the table, generating a VLAN packet that includes this VID, and sending this VLAN packet to the MPLS network.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a diagram useful in describing the topology of enterprise networks which utilize MPLS;

FIGS. 7A to 7C are diagrams useful in describing enterprise networks;

FIGS. 11A to 11C are diagrams useful in describing an enterprise VPN table in each edge router;

FIG. 12 is a diagram useful in describing transmission from a CPE A to a CPE C;

DESCRIPTION OF THE PREFERRED EMBODIMENT

(A) Overview of the Present Invention

Figure 1:
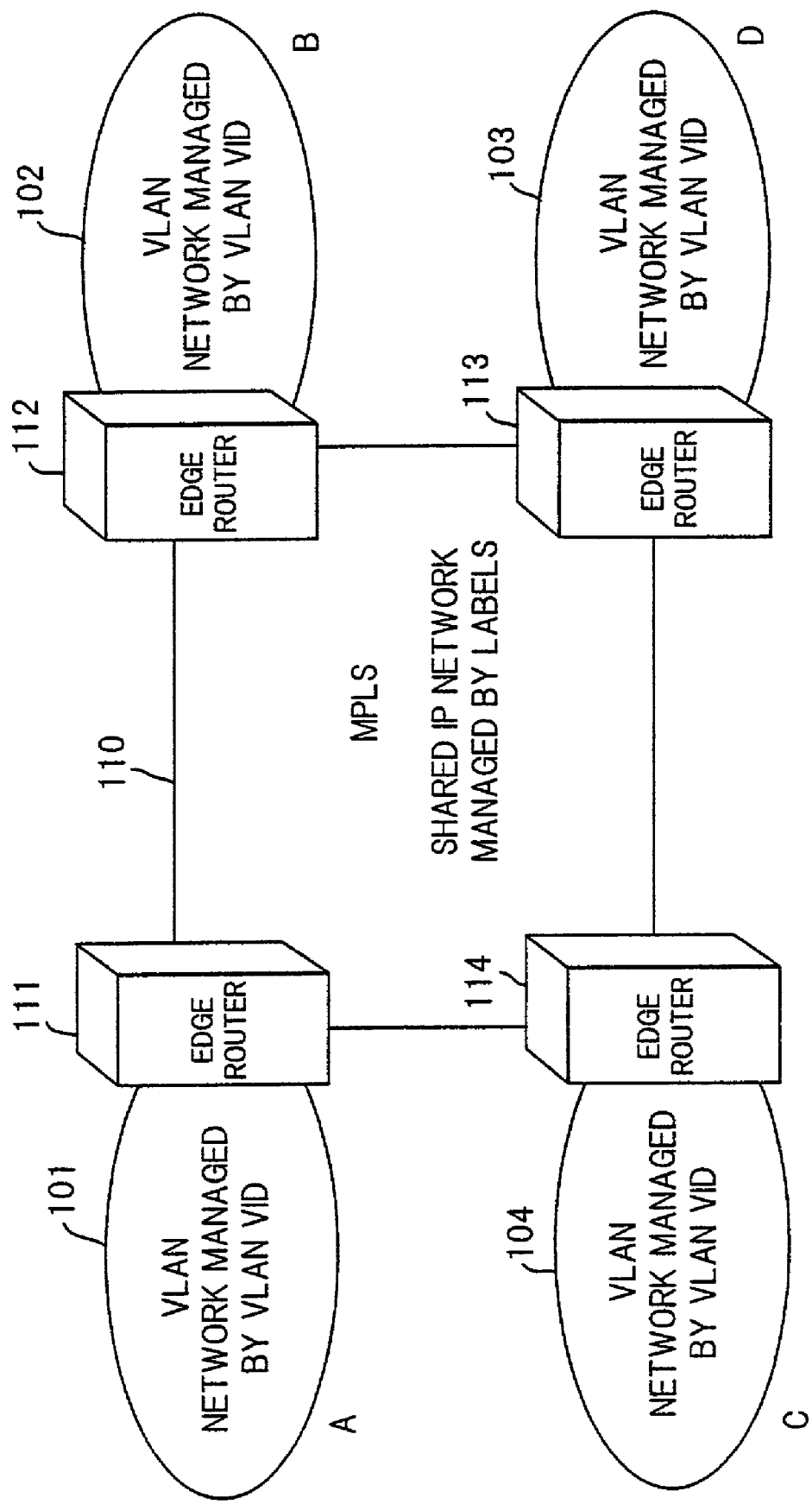
FIG. 1 is a schematic view of mixed VLAN and MPLS networks according to the present invention.
Figure 15:
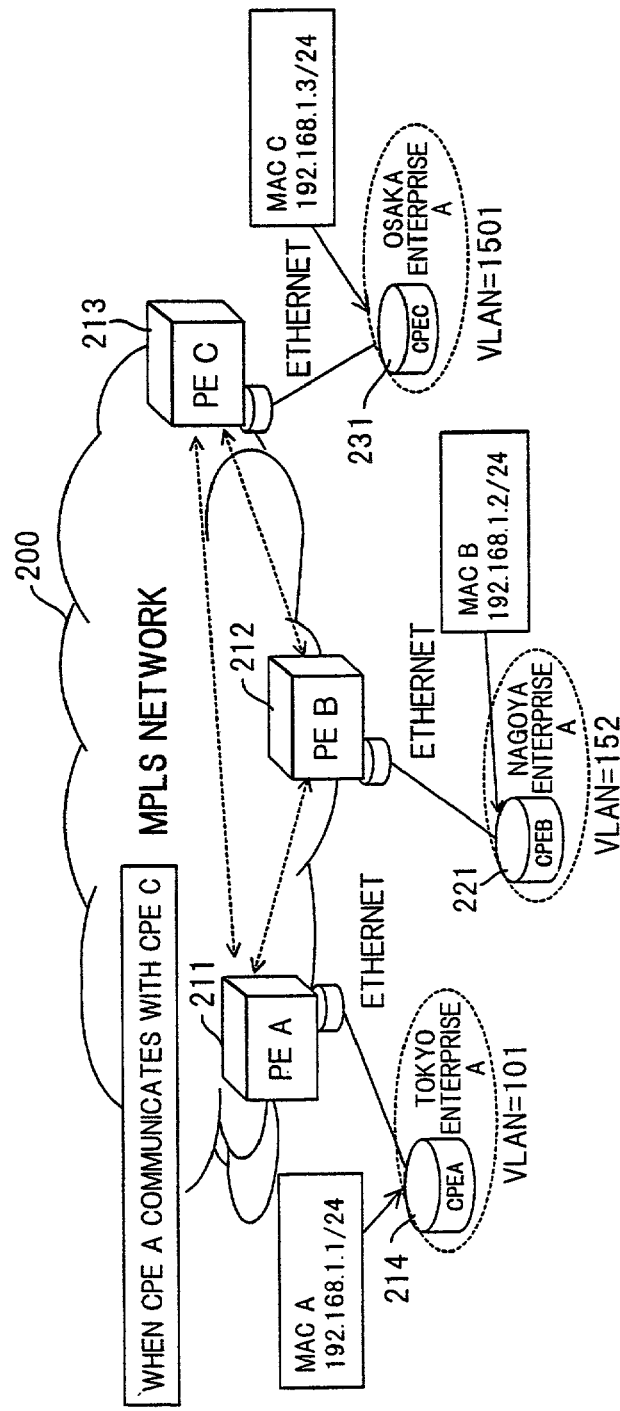
FIGS. 15A, 15B are diagrams useful in describing learning in case of a transmission from a CPE A to a CPE C.
Figure 20:
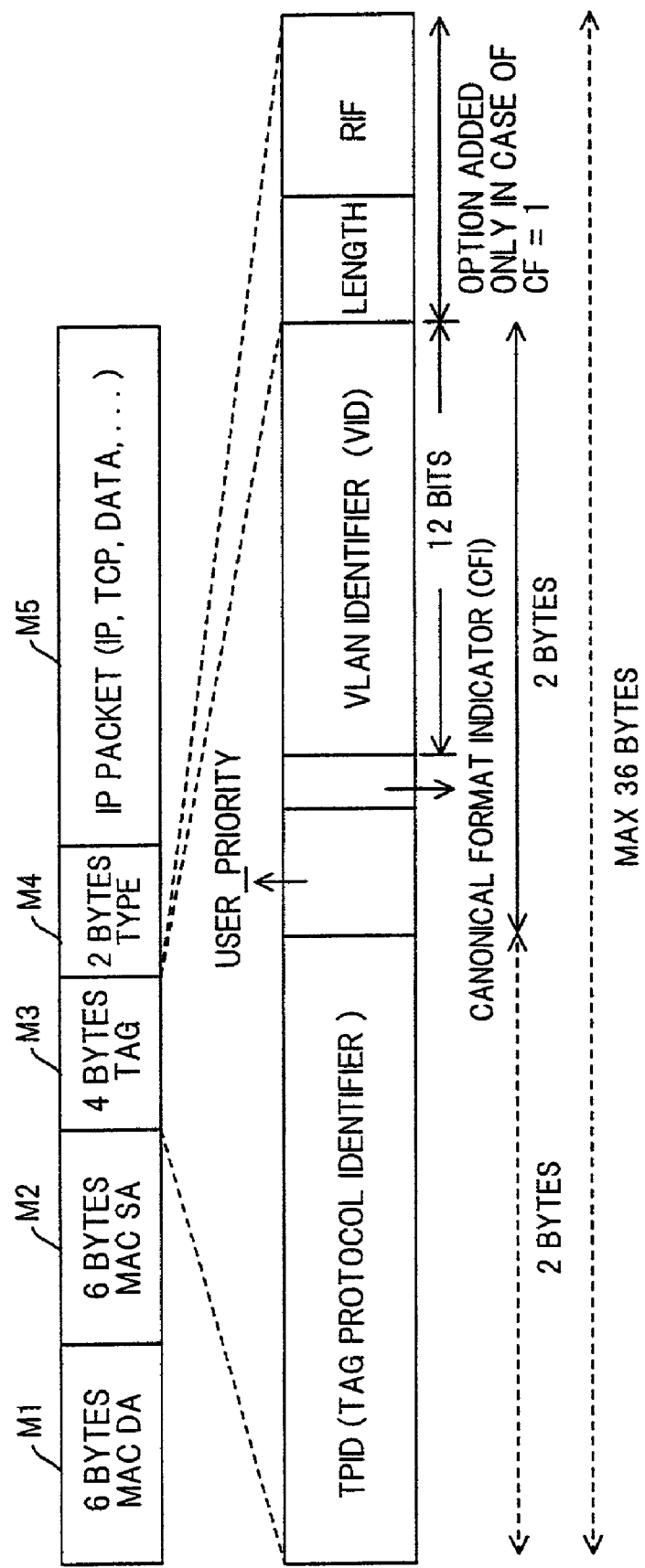
FIG. 20 shows the format of a MAC frame in a VLAN according to the prior art.
Figure 21:
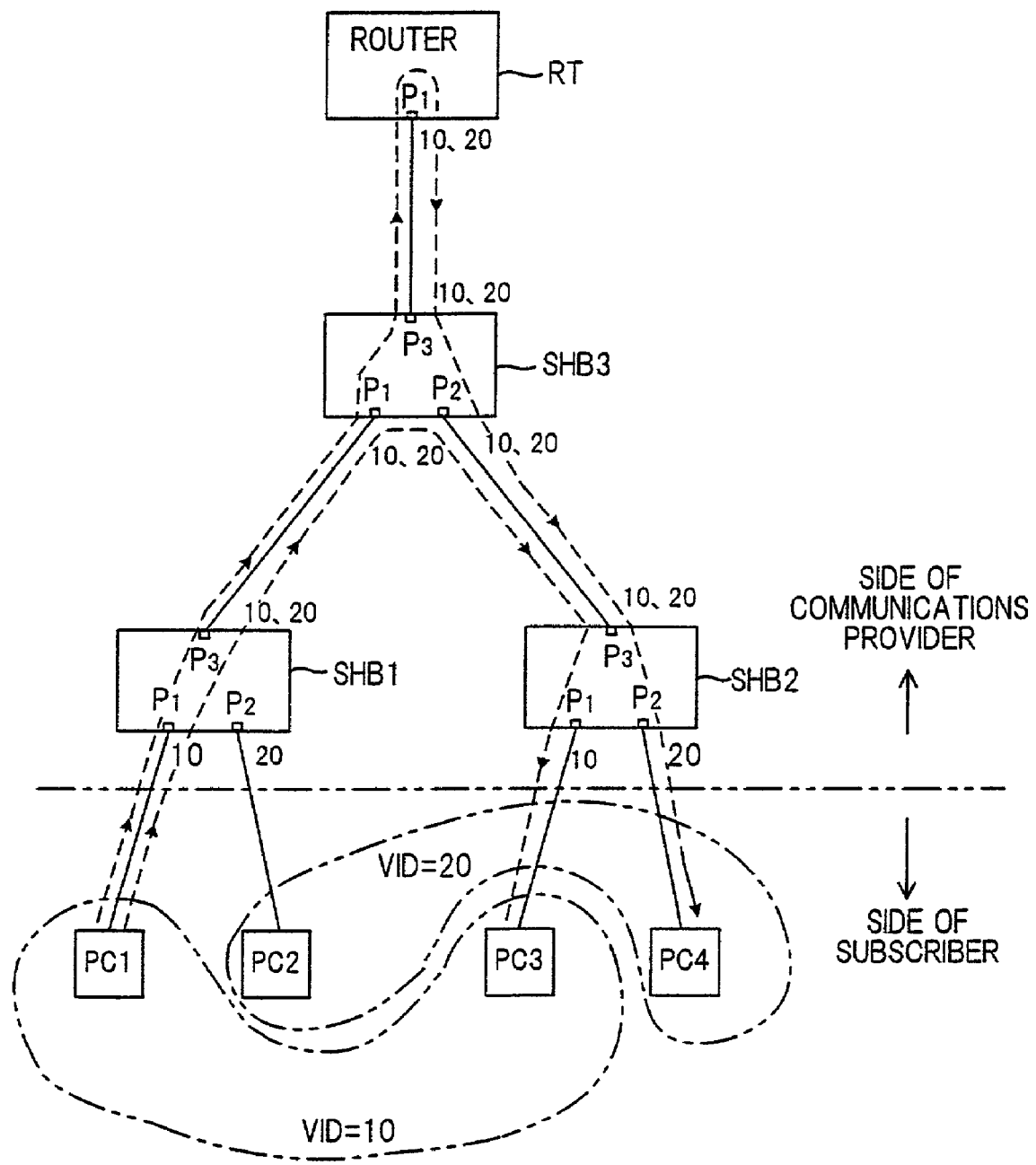
FIG. 21 illustrates an example of VLAN implementation according to the prior art.
Figure 22:
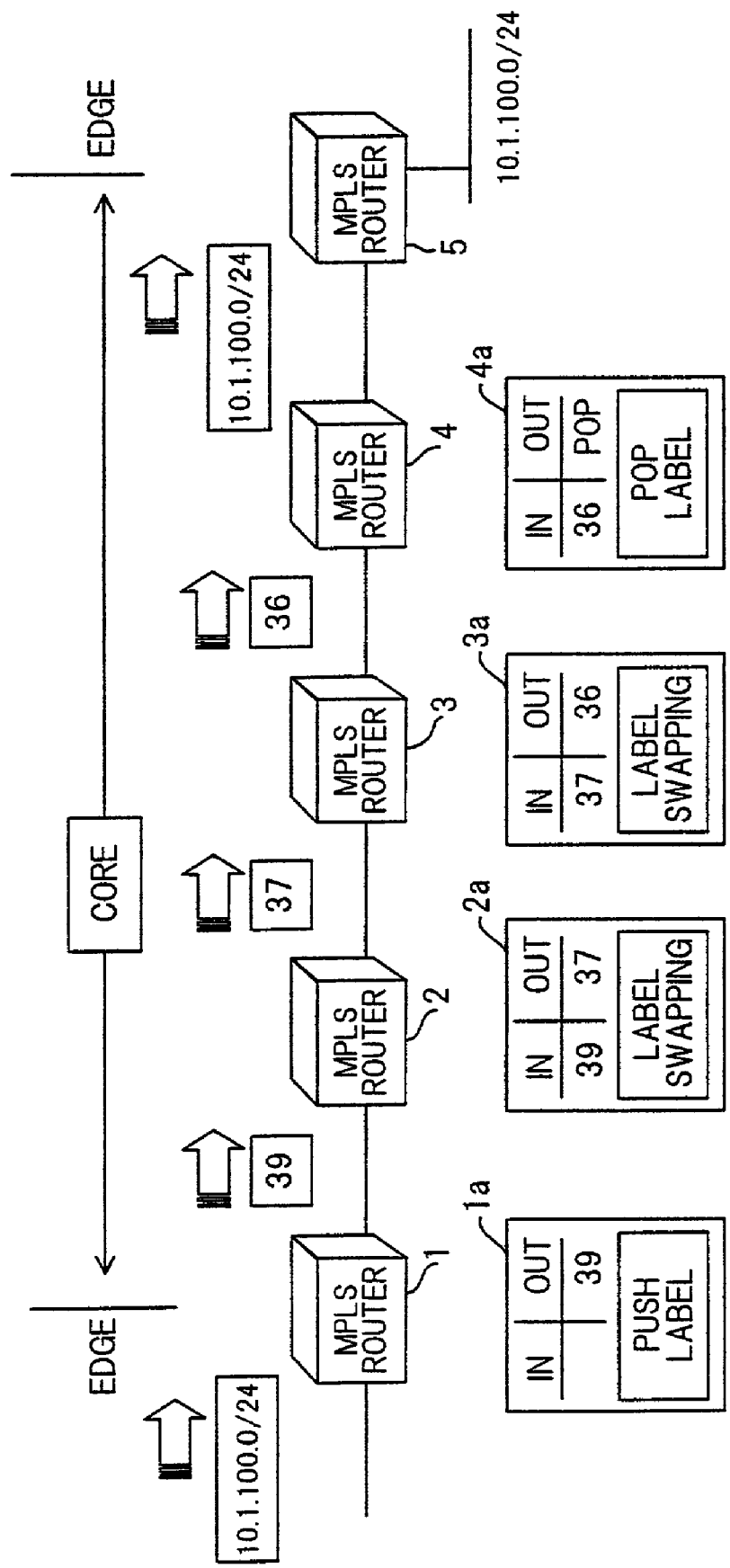
FIG. 22 is a diagram useful in describing MPLS according to the prior art.
Figure 23:
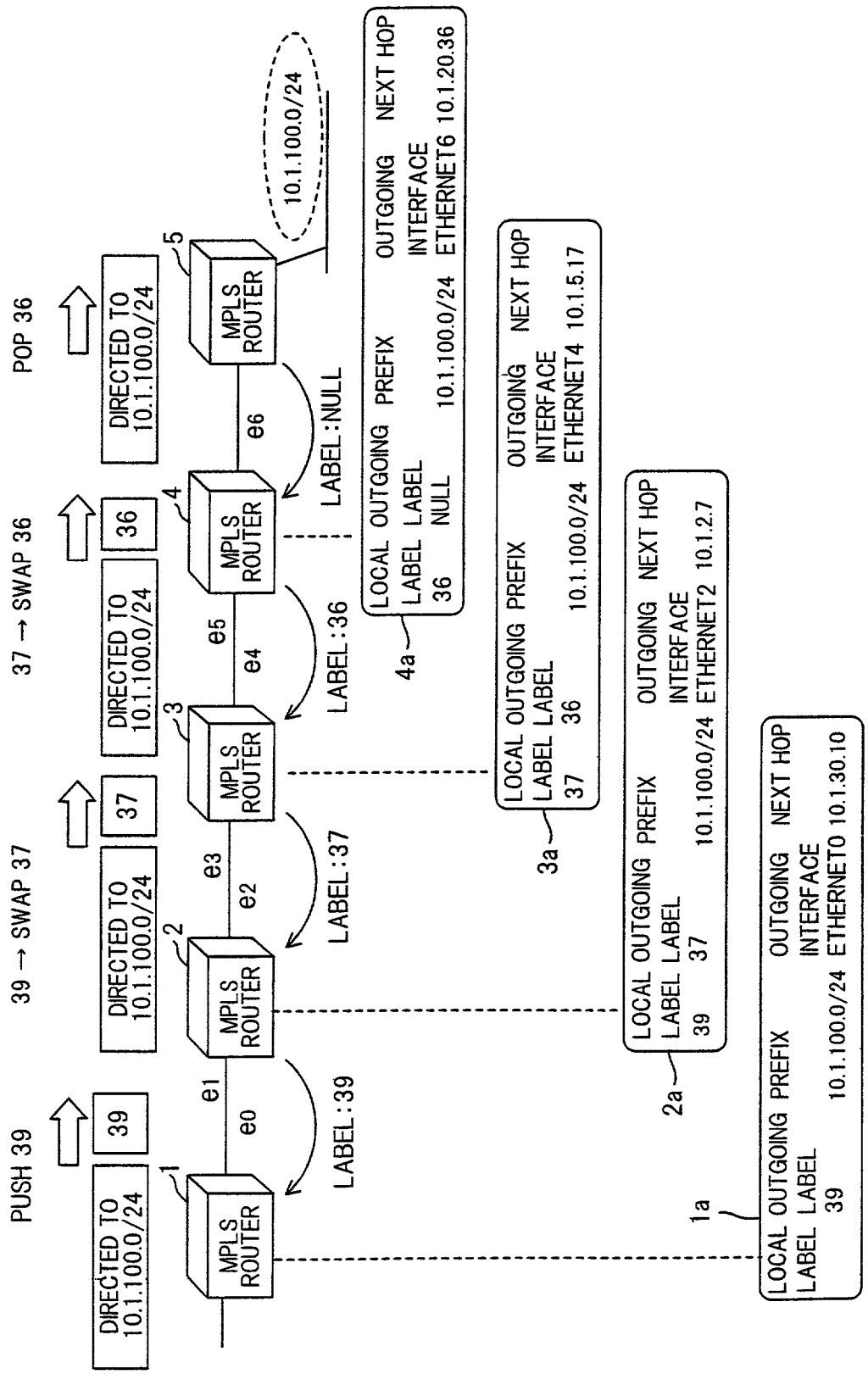
FIG. 23 is a diagram useful in describing the manner in which a label path is set up according to the prior art.
Figure 24:
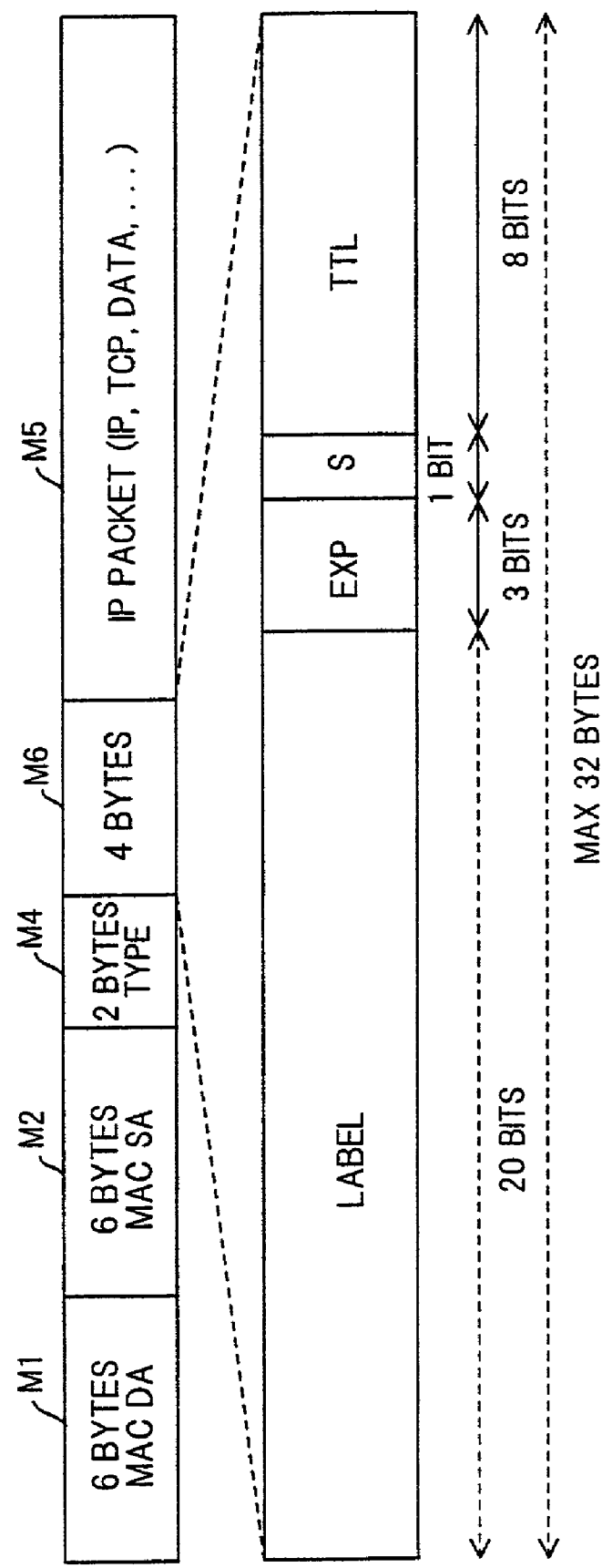
FIG. 24 is a diagram useful in describing the structure of a shim header and the position at which the shim header is inserted according to the prior art.
Figure 25:
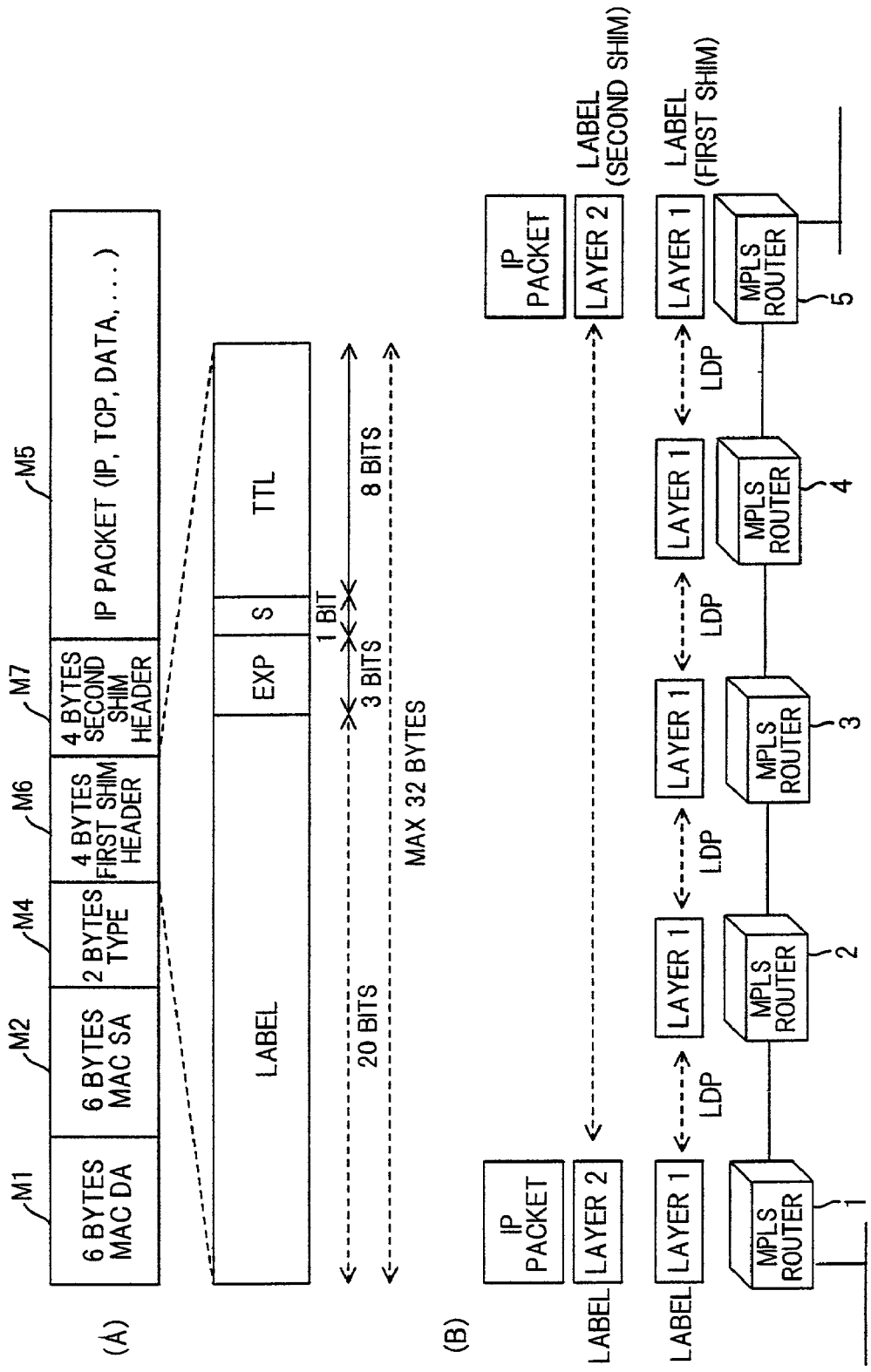
FIG. 25 is a diagram useful in describing the stacking of shim headers according to the prior art.
Figure 26:
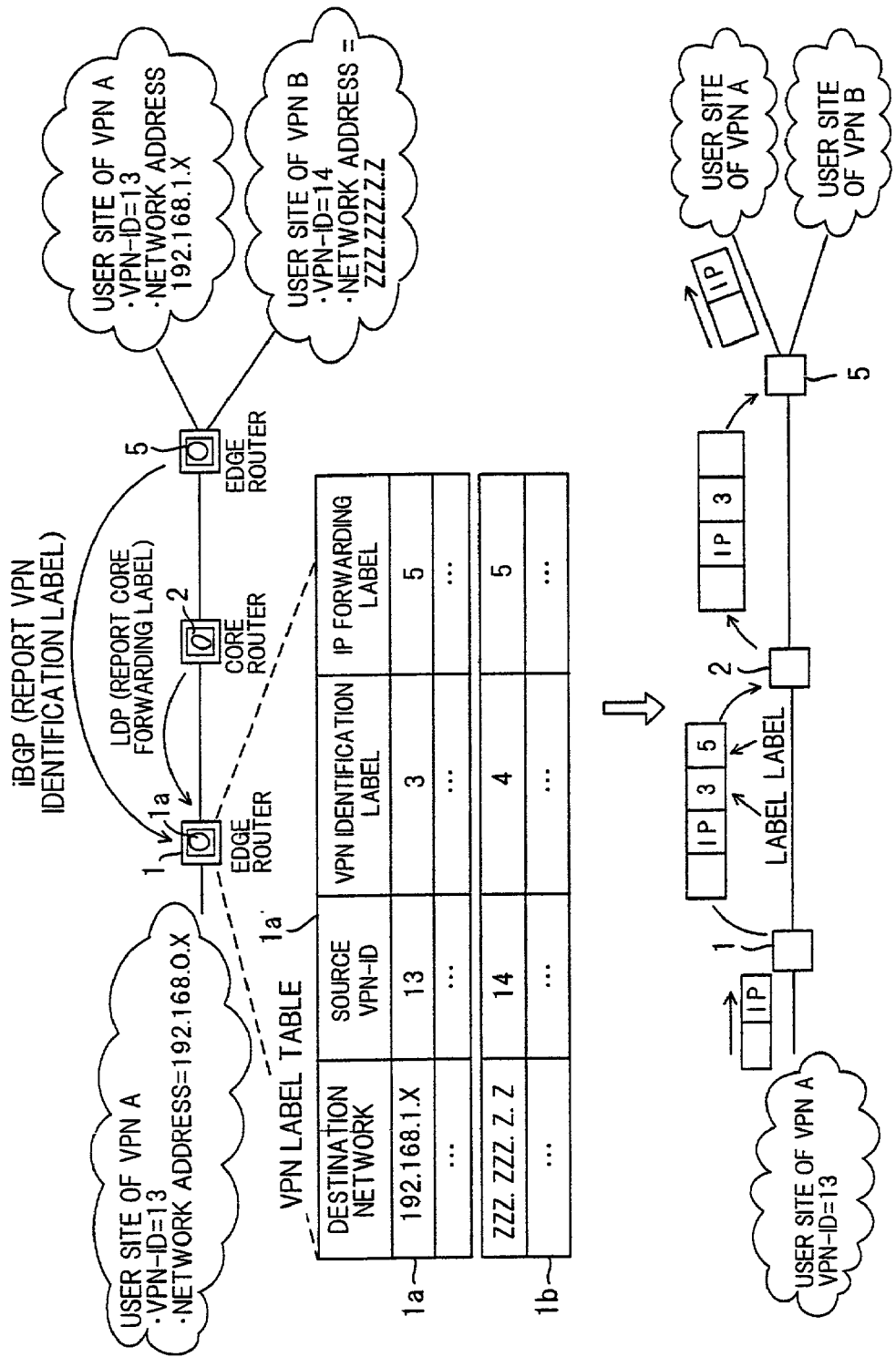
FIG. 26 is a diagram useful in describing MPLS/VPN according to the prior art.
Figure 27:
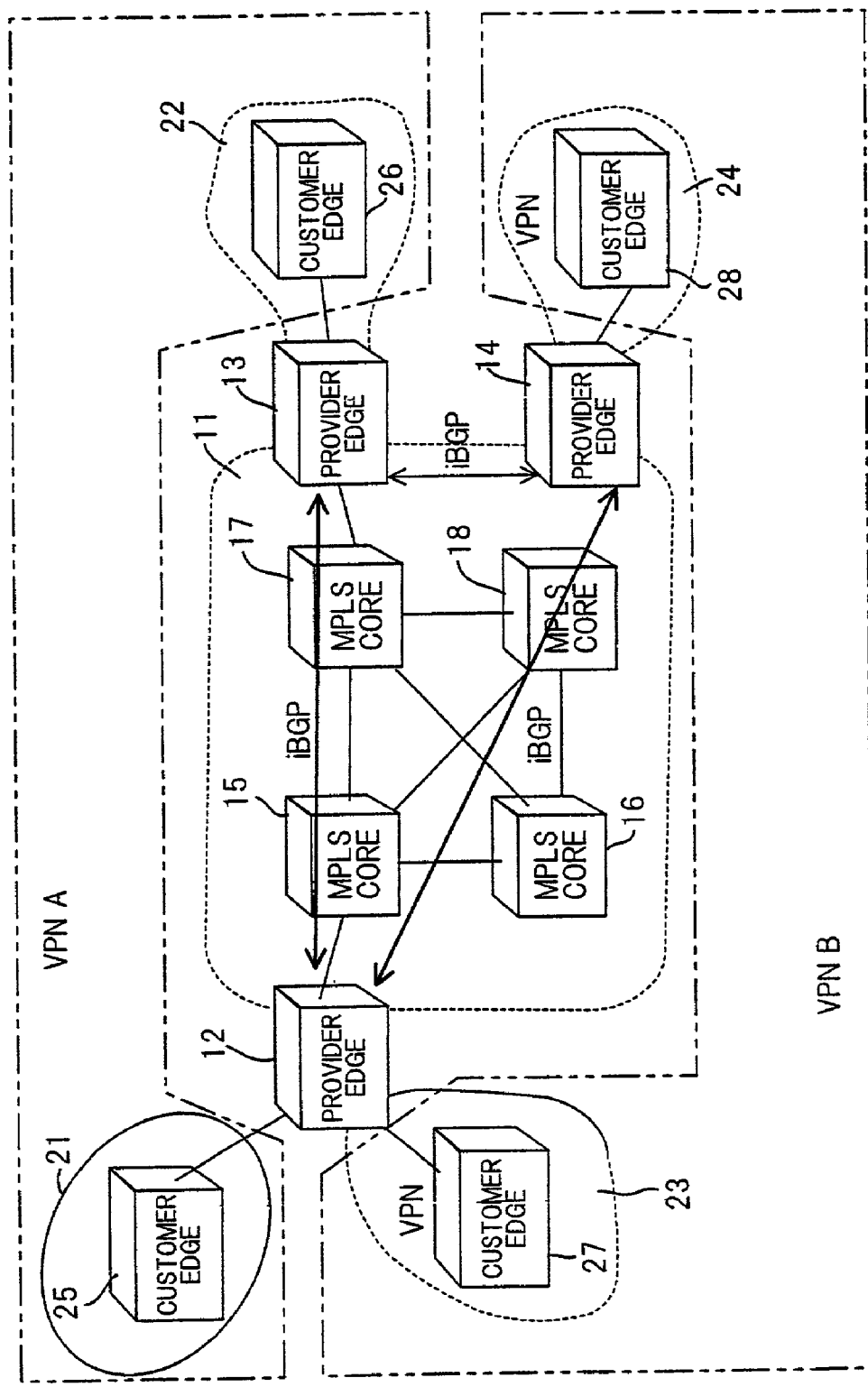
FIG. 27 is a diagram useful in describing MPLS/VPNs according to the prior art.

FIG. 1 is a schematic view showing a mixed network composed of VLANs and an MPLS network according to the present invention. Here VLANs 101 to 104 of sites A to D, respectively, are managed by prescribed VIDs (VLAN IDs). A shared network (MPLS network) 110, which is managed by labels, has been constructed on the Internet (a WAN) by MPLS. The edges of the MPLS network are provided with edge routers 111 to 114. A transmit-side edge router converts VLAN packets (see FIG. 20), which enter from the VLANs 101 to 104, to MPLS packets [see (A) in FIG. 15] and transmits the MPLS packets, and a receive-side edge router converts MPLS packets to VLAN packets and outputs the VLAN packets to prescribed VLANs.

More specifically, the transmit-side edge router converts a VID contained in a VLAN packet to a VPN label, which is a VPN identifier, finds a forwarding label for forwarding the packet along a prescribed route on the basis of the destination of the VLAN packet, imposes these labels in place of the VIN to generate an MPLS packet, and sends the MPLS packet to the MPLS network 110. The latter routes the MPLS packet to the target receive-side edge router over a preset route while the forwarding label of the packet is replaced. Upon receiving the MPLS packet from the MPLS network, a receive-side edge router removes the forwarding label, converts the VPN label to the original VID, adds this VID to the packet in place of the label to generate a VLAN packet and sends the VLAN packet to the VLAN indicated by the VID. As a result of this operation, a packet can be transmitted from a transmit-side VLAN belonging to a certain VPN to a receive-side VLAN belong to the same VPN.

Figure 2:
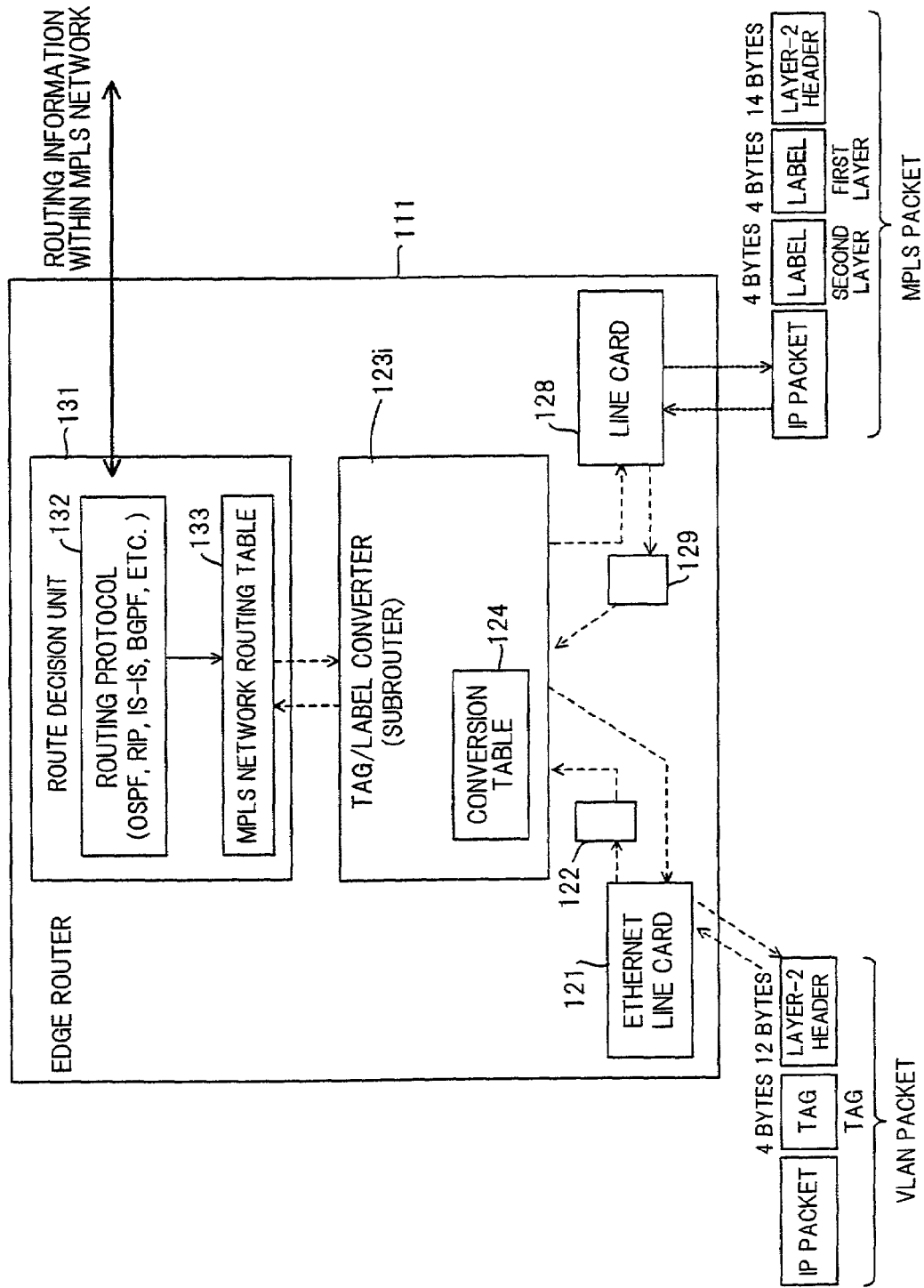
FIG. 2 is a diagram schematically showing the structure of an edge router.
Figures 3, 4:
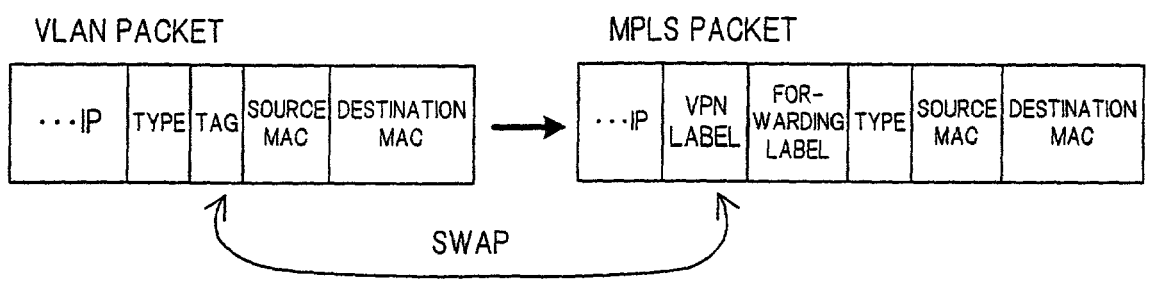
FIG. 3 is a diagram useful in describing swapping of VLAN and MPLS packets.
FIG. 4 shows a table for converting VIDs to VPN labels.

FIG. 2 is a diagram schematically showing the structure of the edge router 111. The other edge routers are identically constructed. The edge router 111 has a line card 121 equipped with an Ethernet interface function for receiving a VLAN packet from a certain VLAN. A VPN identification unit 122 identifies a VPN by referring to the VID of the received VLAN packet and inputs the packet to a tag/label converter (subrouter) 123$i$ ($i$=1, 2, . . . ) that corresponds to this VPN. The subrouter 123$i$ corresponding to the identified VPN has a table 124 which, as shown in FIG. 4, already stores the correspondence between (1) VLAN IDs (VIDS) and (2) VPN identifiers (VPN labels) that specify VPNs to which the VLANs specified by the VIDs belong. The edge router 111 further includes a route decision unit 131 for deciding beforehand a route to a receive-side edge router using a routing protocol 132 and stores a forwarding label (a push label), which specifies the decided route, in an MPLS network routing table (forwarding-label memory) 133 in correspondence with the IP address of the receive-side edge router.

When a packet enters, the subrouter 123$i$ refers to table 124 to find the VPN identifier (VPN label) corresponding to the VID contained in the tag. The subrouter 123$i$ further finds the receive-side edge router based upon the destination address contained in the packet and finds the forwarding label, which has been stored in correspondence with the IP address of this edge router, from the MPLS network routing table 133.

If the label is found, the subrouter 123$i$ inserts (swaps) the VPN label and the forwarding label in place of the tag of the packet and sends the MPLS packet to the MPLS network 110 via a line card 128. The MPLS network 110 thenceforth routes the MPLS packet to the target receive-side edge router over the preset route while replacing the forwarding label. The line card 128 of the receive-side edge router receives an MPLS packet from the MPLS network 110, and a VPN identification unit 129 identifies the VPN by referring to the VPN label of the MPLS packet and inputs the packet to the subrouter 123$i$ ($i$=1, 2, . . . ) that corresponds to the VPN.

Figure 5:
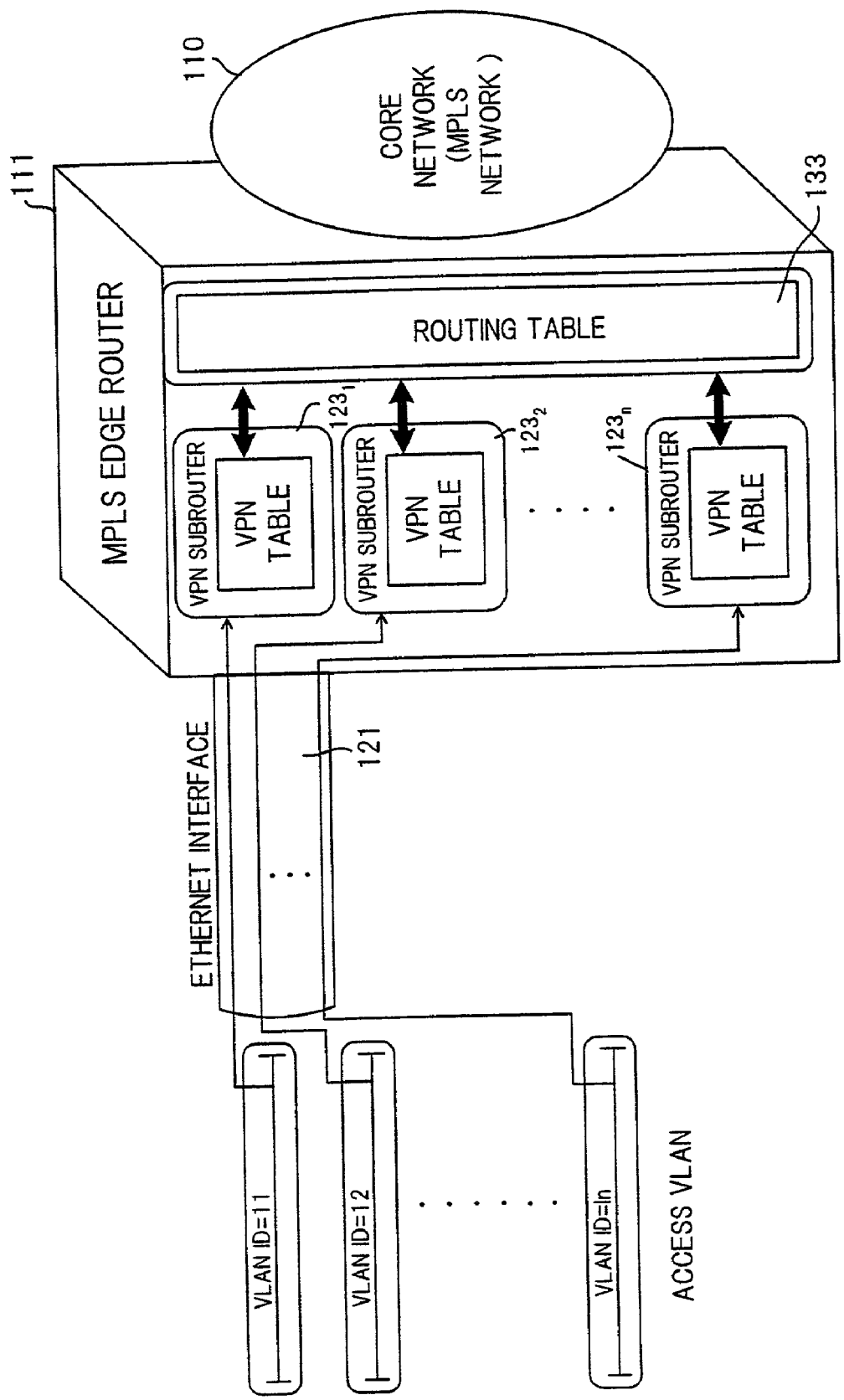
FIG. 5 is another diagram showing the structure of the edge router.

The subrouter 123$i$ removes the forwarding label and then refers to the table 124 to find the VID that corresponds to the VPN label. The subrouter 123$i$ then generates a VLAN packet by adding a tag, which includes the VID found, in place of the VPN label and sends this VLAN packet to the VLAN, which is indicated by the VID, via the line card 121 on the side of the VLAN. It should be noted that the content of table 124 is not the same in each of the edge routers 111 to 114 and that the VID values of VLANs that belong to the same VPN are not necessarily the same. Further, though not shown clearly in FIG. 2, a subrouter exists for every VPN, as illustrated in FIG. 5.

Thus, when communication is initiated from the VLAN 101 of site A to the VLAN 103 of site D in FIG. 1, the tag and label are swapped by the edge routers 111, 113 in the manner shown in FIG. 3. As a result, a VLAN packet that enters from the transmit-side VLAN is changed to an MPLS packet by the edge router 111, the MPLS packet is transmitted through the MPLS network 110 and is converted to a VLAN packet by the edge router 113, and this VLAN packet is then transmitted to a VLAN belonging to a VPN identical with that on the transmit side.

(B) Topology of MPLS-based Enterprise Networks

FIG. 6 is a diagram useful in describing the topology of enterprise networks that rely upon an MPLS network. As shown in FIG. 6, an MPLS network 200 has been formed on the Internet serving as a shared network. Numerals 201, 202 and 203 denote VLAN domains for Tokyo, Nagoya and Osaka, respectively. The Internet is indicated at 204 and a firewall (FW) is shown at 205. A plurality of enterprise VLANs have been set up at each of the VLAN domains. Provided between the MPLS network 200 and the VLAN domains 201 to 203 at the edge of the MPLS network are provider edge routers (PEs) 211 to 213, respectively, which terminate the respective VLANs.

A VLAN (VID=101) of an Enterprise A and a VLAN (VID=2) of an Enterprise B in the Tokyo area have been formed in the VLAN domain 201 for Tokyo. A CPE router (Customer Pre-equipment Edge router) 214 constituting part of the VLAN (VID=101) of Enterprise A is connected by Ethernet to a first port of the edge router PE 211 via a Level-2 switch (switching hub) 215. A CPE router 216 constituting part of the VLAN (VID=2) of Enterprise B is connected by Ethernet to a Level-2 switch (switching hub) 217. The switching hub 217 is connected to a second port of PE 211.

A VLAN (VID=152) of the Enterprise A and an intranet of an Enterprise C in the Nagoya area have been formed in the VLAN domain 202 for Nagoya. A CPE router 221 constituting part of the VLAN (VID=152) of Enterprise A is connected by Ethernet to a first port of the edge router PE 212 via a Level-2 switch (switching hub) 222. A CPE router 224 constituting part of the intranet of Enterprise C is connected to the second port of PE 212.

A VLAN (VID=1501) of the Enterprise A and an intranet of the Enterprise C in the Osaka area have been formed in the VLAN domain 203 for Osaka. A CPE router 231 constituting part of the VLAN (VID=1501) of Enterprise A is connected by Ethernet to a first port of the edge router PE 213 via a Level-2 switch (switching hub) 232. A CPE router 234 constituting part of the intranet of Enterprise C is connected to the second port of PE 213.

The VLAN (VID=101), VLAN (VID=152) and VLAN (VID=1501) of Enterprise A in the respective areas construct the same VPN. If the side of the MPLS network is viewed from the side of Enterprise A, therefore, it appears as though the CPE routers 214, 221, 231 have been connected to a Layer-2 switching hub SHB, as illustrated in FIG. 7A, and the network of Enterprise A takes on an L2 (VLAN)-over-MPLS network topology in which a core network is constructed by the MPLS network and an access network is constructed by the VLANs. If the side of the MPLS network is viewed from the side of Enterprise B, it appears as though the CPE router 216 and firewall 205 have been connected to a Layer-2/3 switching hub SHB', as illustrated in FIG. 7B, and the network of Enterprise B takes on the form of an Internet connection. If the side of the MPLS network is viewed from the side of Enterprise C, it appears as though the CPE routers 224, 234 of the intranets 223, 233, respectively, have been connected to a router RT, as illustrated in FIG. 7C, and the network of Enterprise C takes on the form of an MPLS/VPNs network topology in which the VPN is constructed by the MPLS network.

(C) L2 (VLAN)-over-MPLS Network

Figure 8:
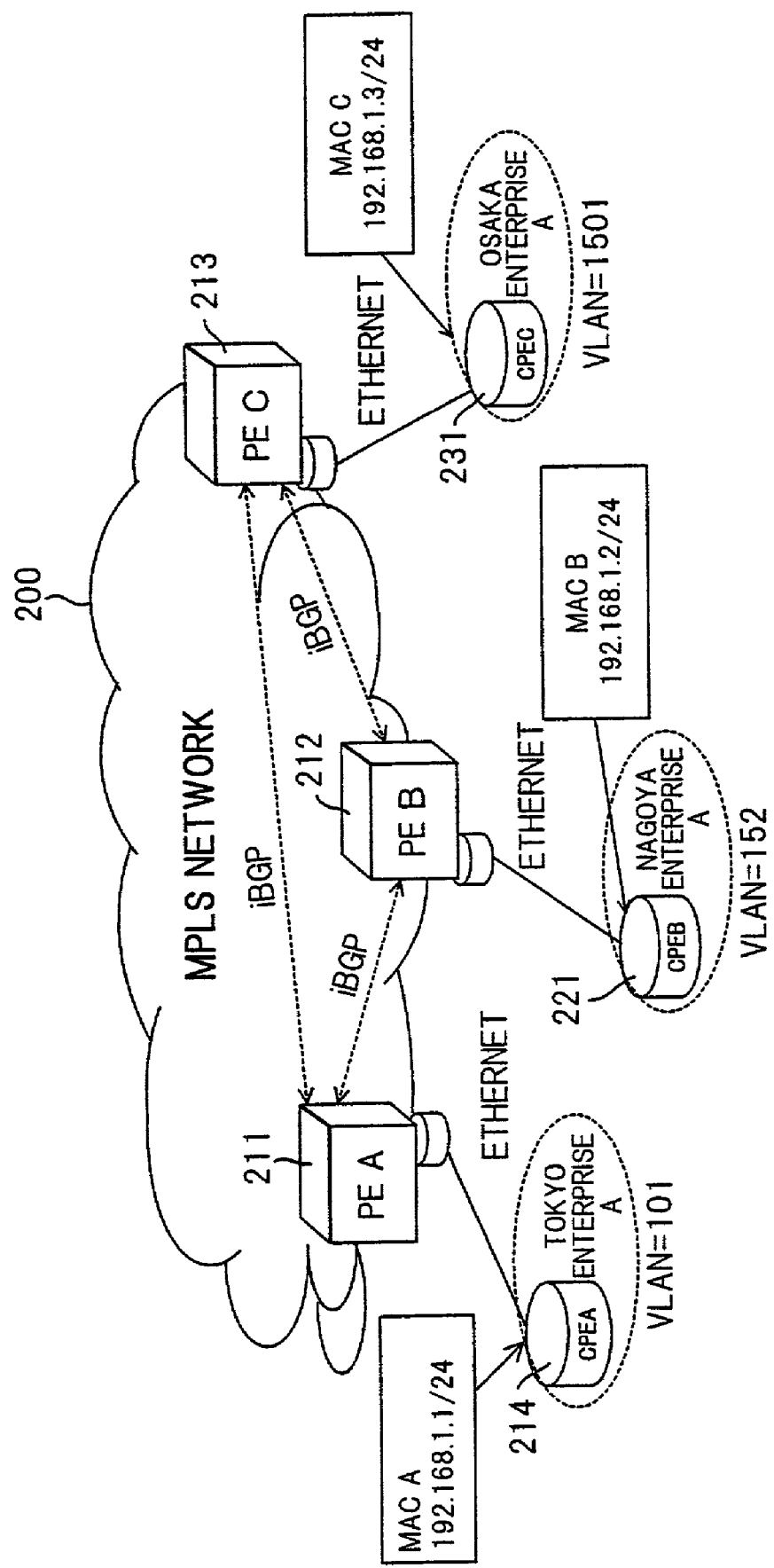
FIG. 8 is a diagram showing an L2-over-MPLS network.

FIG. 8 is an overall view of an L2 (VLAN)-over-MPLS network according to the present invention. Here components related to Enterprise A have been extracted from FIG. 6, and those components that are identical to those of FIG. 6 are designated by like reference characters. MAC addresses MAC A, MAC B and MAC C, which are Layer-2 addresses, have been assigned to the routers CPE A 214, 221 and 231, respectively, that construct the VLANs.

(D) Edge Router Structure

Figure 9:
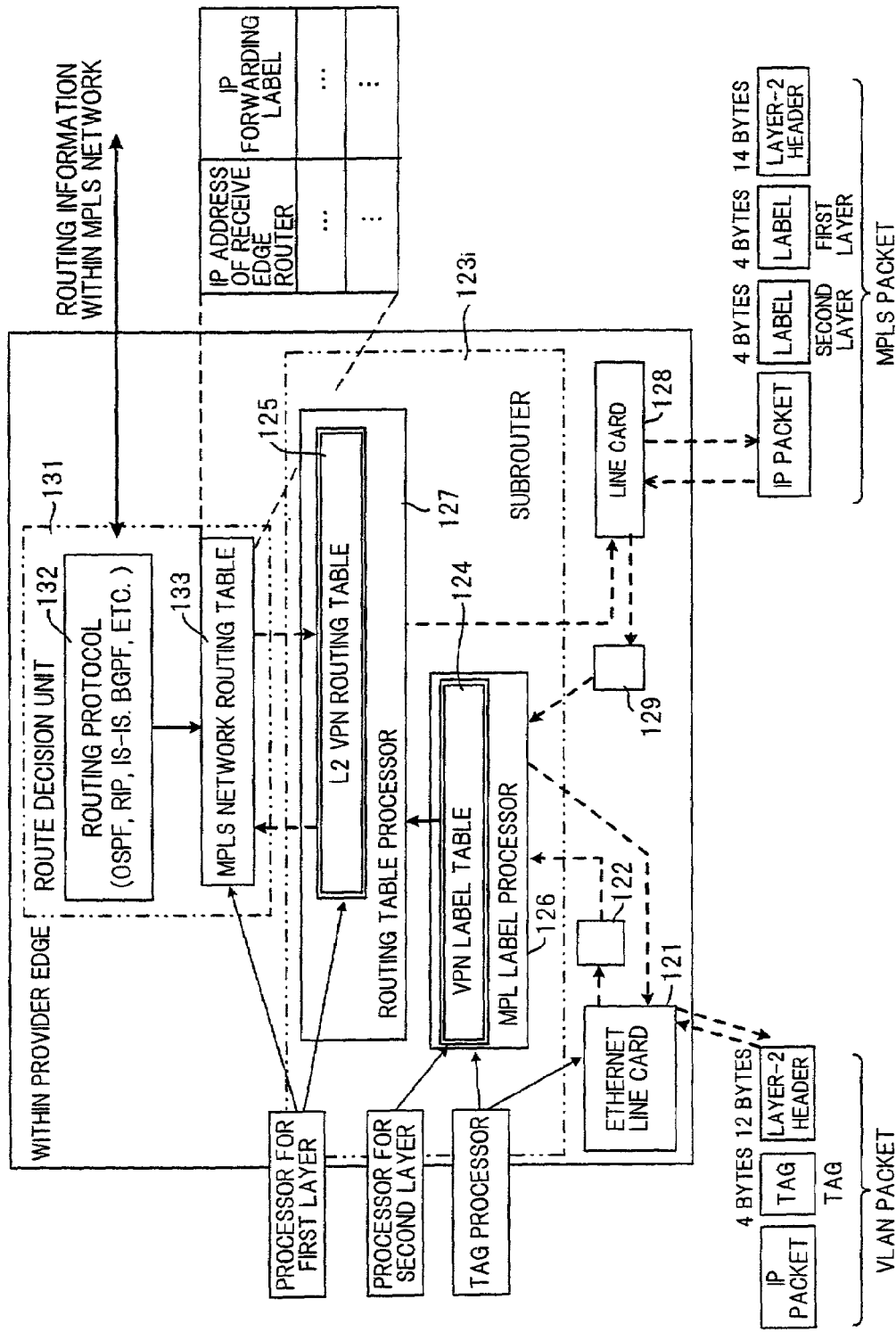
FIG. 9 is a diagram showing the internal structure of a PE router (edge router)

The edge routers PE A to PE C are identically constructed. FIG. 9, which illustrates the structure of an edge router, shows the details of the edge router depicted in FIG. 2. Components in FIG. 9 that are identical to those of FIG. 2 are designated by like reference characters.

Figure 10A:
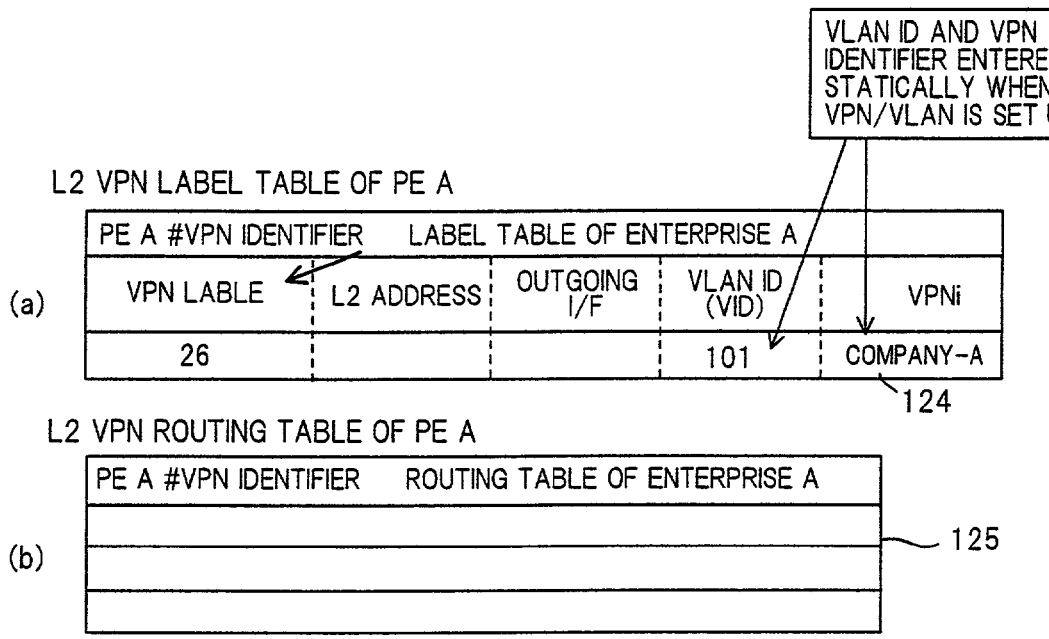
FIGS. 10A, 10B are diagrams useful in describing the generation of a VPN table.

The line card 121, which has an Ethernet interface function, receives a VLAN packet from a prescribed VLAN. The VPN identification unit 122 identifies the VPN by referring to the VID of the received VLAN packet and inputs the packet to the subrouter 123i that corresponds to this VPN. As shown in (a) of FIGS. 10A and 10B, the Layer-2 label table 124 of the subrouter 123i already stores the correspondence among (1) VPN labels (VPN identifiers), (2) Layer-2 addresses (MAC addresses) of CPE routers under control, (3) output-side interfaces, (4) identifiers (VIDs) of VLANs connected to the edge routers, and (5) VPNi (VPN instance: a convenient name for a VPN identifier). FIG. 10A illustrates the initial state and FIG. 10B the state that results after various data have been set.

Figure 10B:
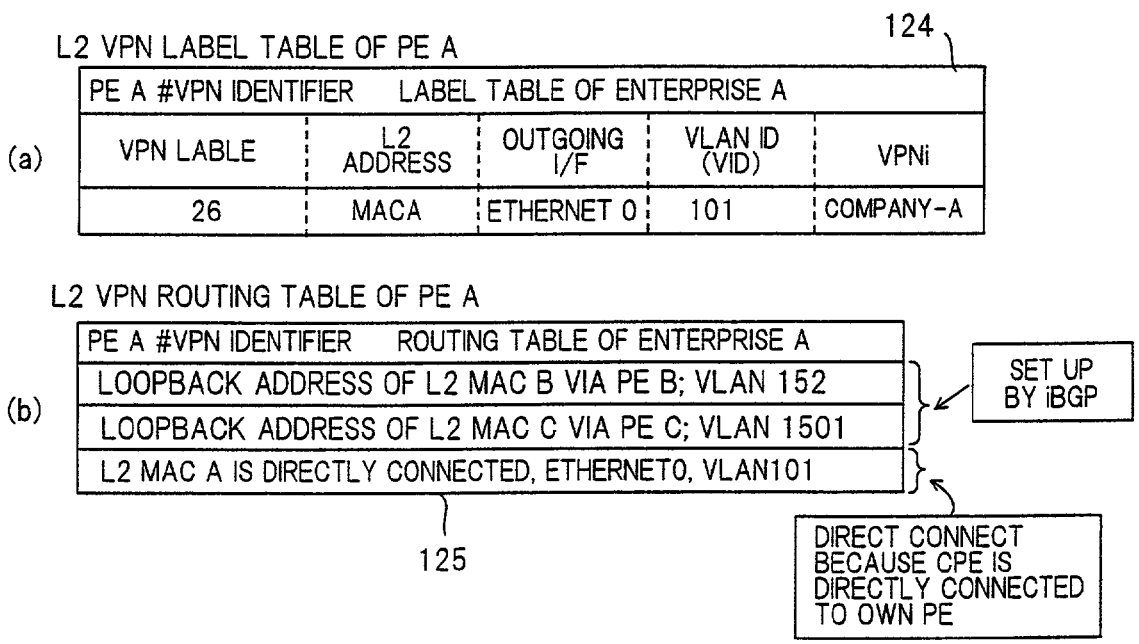

For every VLAN constructing the VPN, an L2 VPN routing table 125 stores (1) a Layer-2 address (MAC address) of the CPE router within the VLAN, (2) a loopback address (IP address) of the edge router to which the CPE router is connected, and (3) an identifier (VID) of the VLAN to which the CPE router belongs, as shown in (b) of FIGS. 10A and 10B. In the example of FIG. 8, (1) MAC addresses MAC A, MAC B, MAC C of CPE routers 214, 221, 231, respectively, (2) loopback addresses (IP addresses) of edge routers (PE A, PE B, PE C) 211, 212,213 to which the CPE routers are connected, and (3) VIDs (=101, 152, 1501) to which the CPE routers belong are stored in the table 125 in correspondence with the VLAN (VID=101), VLAN (VID=152) and VLAN (VID=1501), respectively, as shown in (b) of FIG. 10B.

The MPLS network routing table (forwarding-label memory) 133 stores forwarding labels which specify the route to the receive edge router. Using a routing protocol, the route decision unit for deciding the route within the MPLS network searches for routes from the transmit-side edge router to the receive-side edge router and assigns a label to each route in accordance with the LDP (Label Distribution Protocol) in such a manner that the VLANs belonging to the same VPN can communicate with one another. Accordingly, the route decision unit 131 decides the route to the receive-side edge router using the routing protocol 132 and stores the forwarding label (push label), which specifies the route decided, in the forwarding label table 133 in a form mapped to the loopback address (IP address) of the receive-side edge router.

If a VLAN packet (see FIG. 20) enters as an input, a VPN label processor 126 finds the VPN identifier (VPN label), which corresponds to the VID contained in the tag, from the VPN label table 124. Further, on the basis of the destination MAC address contained in the VLAN packet, a routing table processor 127 obtains the loopback address of the output-side edge router from the L2 VPN routing table 125 and then finds the forwarding label (push label), which corresponds to the above-mentioned loopback address (IP address), from the forwarding label table 133. If the VPN label and push label have been found, the subrouter 123$i$ swaps the VPN label and forwarding label for the tag to generate an MPLS packet, as shown in FIG. 3, and sends this MPLS packet to the MPLS network 200 via the line card 128.

The MPLS packet arrives at the target receive-side edge router along the preset route through the MPLS network while its forwarding label is replaced. The line card 128 of the receive-side edge router receives the MPLS packet from the MPLS network 200, and the VPN identification unit 129 identifies the VPN by referring to the VPN label of this MPLS packet and inputs the packet to the subrouter 123$i$ (i=1, 2, . . . ) corresponding to this VPN. The subrouter 123$i$ removes the forwarding label and refers to the VPN label table 124 to find the VID corresponding to the VPN label. The subrouter 123$i$ then swaps a tag, which contains the VID, for the VPN label to thereby generate a VLAN packet and sends this VLAN packet via the line card 121 to the VLAN indicated by the VID. It should be noted that the VPN label tables 124 in the edge routers 221 to 213 (FIG. 8) are not identical in content and that the VID values of VLANs that belong to the same VPN are not necessarily the same. Further, though not shown clearly in FIG. 9, the subrouter 123$i$ (i=1, 2, . . . ) and the forwarding label table 133 exist for every VPN.

(E) Generation of VPN Tables

In order to arrange it so that VLANs belonging to a VPN can communicate with each other, it is necessary (1) to establish beforehand a route between the edge routers to which these VLANs are connected and store the forwarding label in the forwarding label table 133 (FIG. 9) of the router along the route, and (2) to create the VPN label table 124 and the L2 VPN routing table 125. A method of creating the forwarding label table 133 is well known and need not be described.

In order to create the VPN label table 124 and L2 VPN routing table 125, it is necessary for the operator to manually enter the VPN identifier (VPN label), the VLAN identifier (VID) and the VPNI, as illustrated at (a) in FIG. 10A. If these items of data are input to the edge router, the VPN label processor 126 of the edge router uses the ARP (Address Resolution Protocol) to find the MAC address of the CPE router of the VLAN connected to this processor, finds the interface of the route over which the MPLS packet with the appended push label is sent, sets this as shown in (a) of FIG. 10B and creates the VPN label table 124.

Next, the routing table processor 127 finds the MAC address of the locally connected CPE router and the VLAN identifier (VID) from the VPN label table 124 and creates direct-connect information of the L2 VPN routing table 125 [see (b) in FIG. 10B]. The edge routers (PE A, PE B, PE C) 211, 212, 213 connected to the VLANs (VIDs=101, 152, 1501) that construct the VPN thenceforth each send the other edge routers the MAC address of the locally connected user router CPE, the loopback address (IP address) of the locally connected edge router and the VID by using the iBGP (interior Border Gateway Protocol). As a result, each edge router completes the fabrication of the L2 VPN routing table 125 [see (b) in FIG. 10B] based upon the received information. Thus, L2 VPN routing tables 125 shown in FIGS. 11A to 11C are created in the edge routers 211, 212, 213, respectively, with regard to the VPN of Enterprise A in FIG. 8.

(F) Example of Communication from CPE A to CPE C

FIG. 12 illustrates an example of transmission in which a packet is transmitted from the user router CPE A belonging to the VLAN (VID=101) of Enterprise A in Tokyo to the user router CPE C belonging to the VLAN (VID=1501) of Enterprise A in Osaka.

The user router CPE A 214 transmits a VLAN packet PKT1 that has been tagged with VID=101. When the packet PKT1 enters the edge router PE A 211, the latter generates an MPLS packet PKT2 by removing the tag and adding, in place of the tag, a VPN label (=26: the VPN identifier of Enterprise A) and a forwarding label (=push label), and sends the packet PKT2 to the MPLS network 200. The MPLS packet PKT2 subsequently arrives at the target receive-side edge router PE C 213 along the preset route through the MPLS network while its forwarding label is replaced. The receive-side edge router PE C 213 creates a VLAN packet PKT3 by removing the labels and adding a VLAN identifier (VID=1501) to which the destination user router CPE C belongs and then sends this packet to the VLAN specified by VID=1501. As a result, the VLAN packet PKT3 arrives at the user router 231.

(G) L2-over-MPLS Transmit Processing

Figure 13:
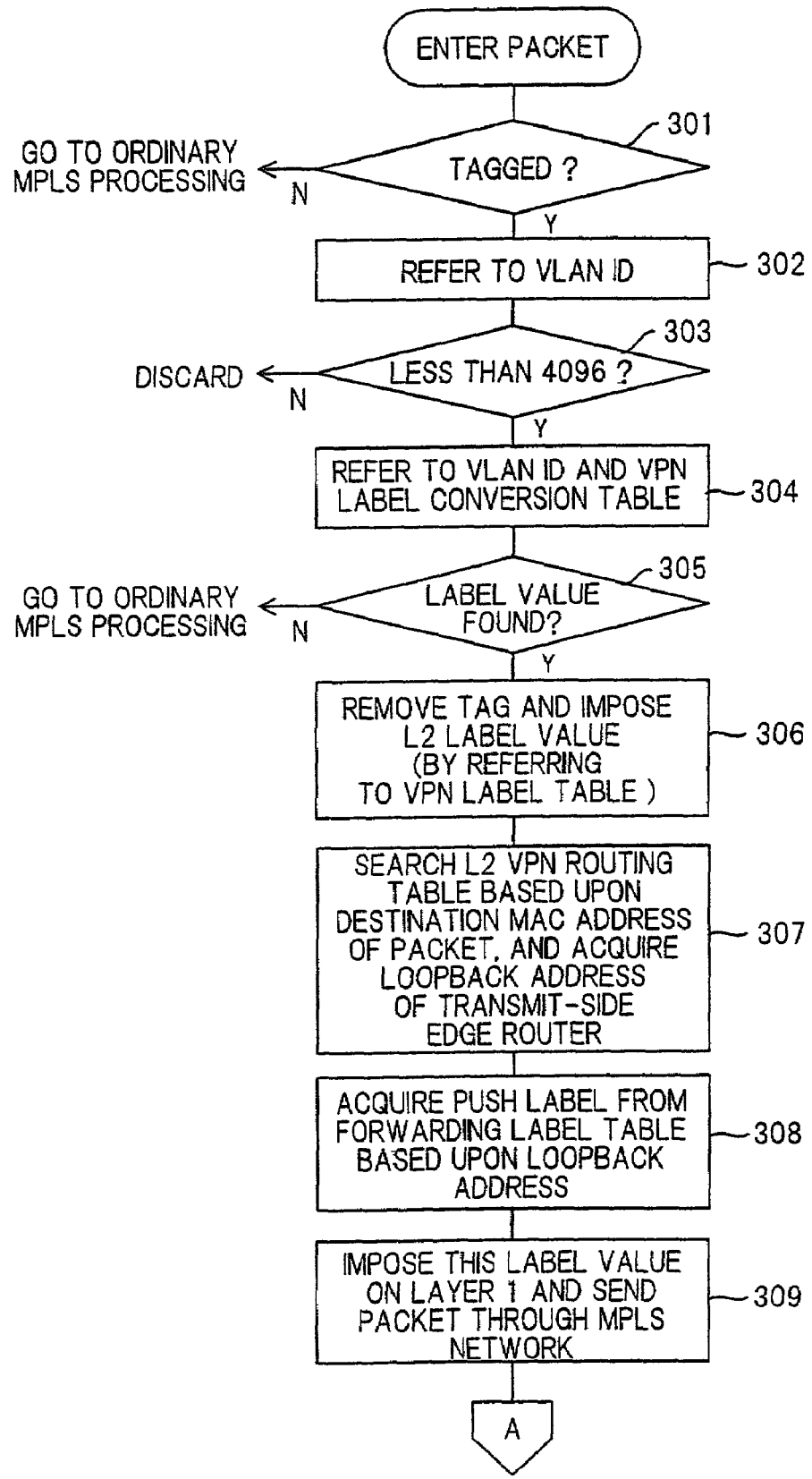
FIG. 13 is part 1 of a flowchart illustrating L2 (VLAN)-over-MPLS transmit processing.
Figure 14:
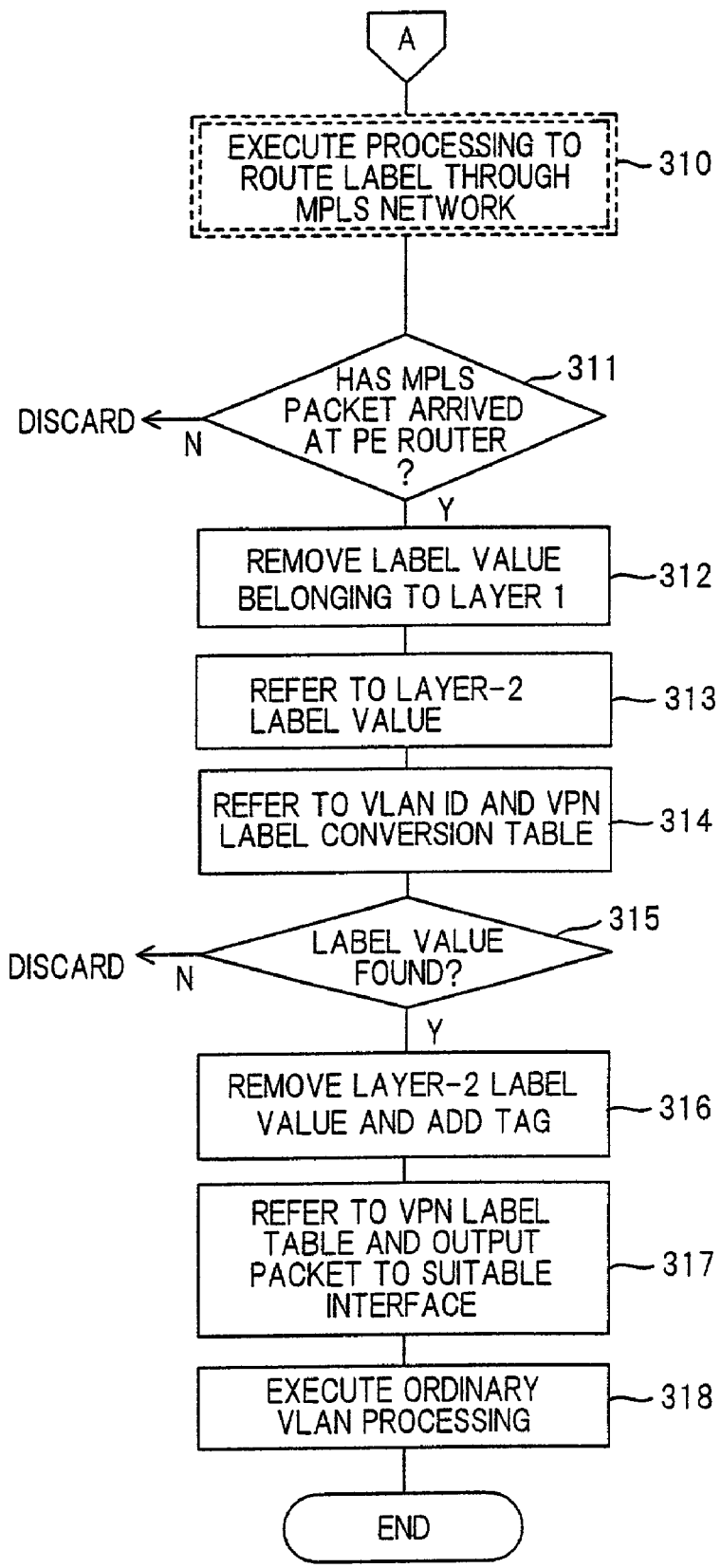
FIG. 14 is part 2 of a flowchart illustrating L2 (VLAN)-over-MPLS transmit processing.

FIGS. 13 and 14 are flowcharts L2-over-MPLS (VLAN-over-MPLS) transmit processing.

When a packet arrives as an input, the transmit-side edge router checks to see whether the packet has been tagged (step 301). Since the packet is an MPLS packet if it has not been tagged, the edge router executes ordinary MPLS processing. If the packet has been tagged, the edge router extracts the value of the VLAN ID (=VID) contained in this tag (step 302) and checks to determine whether the VID value is equal to or greater than 4096 (step 303). If the VID value is equal to or greater than 4096 ("NO" at step 303), this means that the range of 0 to 4095 of VID values has been exceeded and the edge router therefore discards this packet. However, if the VID value lies within the range 0 to 4095 ("YES" at step 303), the edge router refers to the VLAN ID and VPN label conversion table 124 (FIG. 9) (step 304) and checks to see whether a VPN label value has been discovered (step 305). If the decision is "NO", then the edge router executes ordinary MPLS processing. If the decision is "YES", on the other hand, the edge router removes the tag and imposes a Layer-2 label value (VPN label) (step 306).

Next, based upon the destination MAC address of the packet, the edge router obtains the loopback address (IP address) of the receive-side edge router from the L2 VPN routing table 125 (step 307). If the loopback address has been found, the edge router refers to the forwarding label table 133 to find the forwarding label (push label) (step 308), imposes the push label as Layer 1 and sends the resulting packet to the MPLS network (step 309).

The above is the processing executed by the edge router on the transmitting side.

This is followed by execution of processing for routing the packet through the MPLS network. The MPLS packet is forwarded to the target receive-side edge router along the set route through the MPLS network while the forwarding label is replaced (step 310).

The receive-side edge router checks to see whether the MPLS packet has arrived (step 311). If the MPLS packet has arrived, the edge router removes the forwarding label attached as Layer 1 (step 312). Next, the edge router extracts the Layer-2 VPN label (step 313), refers to the table 124 indicating the correspondence between the VLAN ID (=VID) and VPN label (step 314) and checks to see whether the VID has been found (step 315). If the VID has not been found, the edge router discards the packet. If the VID has been found, however, the edge router removes the Layer-2 label and adds a tag that contains the VID to create a VLAN packet (step 316). Next, the edge router refers to the VPN label table 124 to find the output interface and sends the VLAN packet to this interface (step 317). The destination user router CPE C receives the VLAN packet and executes predetermined processing (step 318).

(H) Processing for Updating VPN Table

The structure of a VPN changes from time to time by being enlarged or otherwise modified by the policy of the enterprise. This makes it necessary to update the VPN tables 124, 125 in conformity with the change in VPN structure. FIGS. 15A and 15B are diagrams useful in describing updating in a case where the user router CPE A communicates with the user router CPE C.

1. If the MAC address of the destination user router CPE C 231 is unknown, the user router CPE A 214 broadcasts an ARP packet containing the IP address of the router CPE C.

2. Upon receiving the ARP packet (broadcast packet), the edge router PE A 211 creates a copy of the packet and directs it through the other edge routers PE B 212 and PE C 213.

3. Upon receiving the ARP packet containing its own IP address, the user router CPE C imposes its own MAC address on an ARP-replay packet and sends back this packet. Each edge router PE automatically updates the MAC address of each CPE in the VPN label table 124 and L2 VPN routing table 125 according to the ARP-reply packet.

4. An ARP packet containing the IP address of each router is broadcast periodically to update each table.

(I) Processing for Disabling Communication Between VLANs Belonging to same VPN

The processing for creating a VPN table described with reference to FIGS. 10 and 11 is for a case where VLANs can communicate with each other freely. However, there are cases where it is desired to prohibit the communication between certain VLANs even though they belong to the same VPN. In such cases, the communication of routing information by iBGP is halted between the edge routers to which the VLANs for which communication is disabled belong. If this arrangement is adopted, the MAC address of the router CPE whose communication is to be disabled and the loopback address (IP address) of the edge router to which this router CPE is connected will no longer be registered in the L2 VPN routing table 125. This makes communication impossible.

Figure 16:
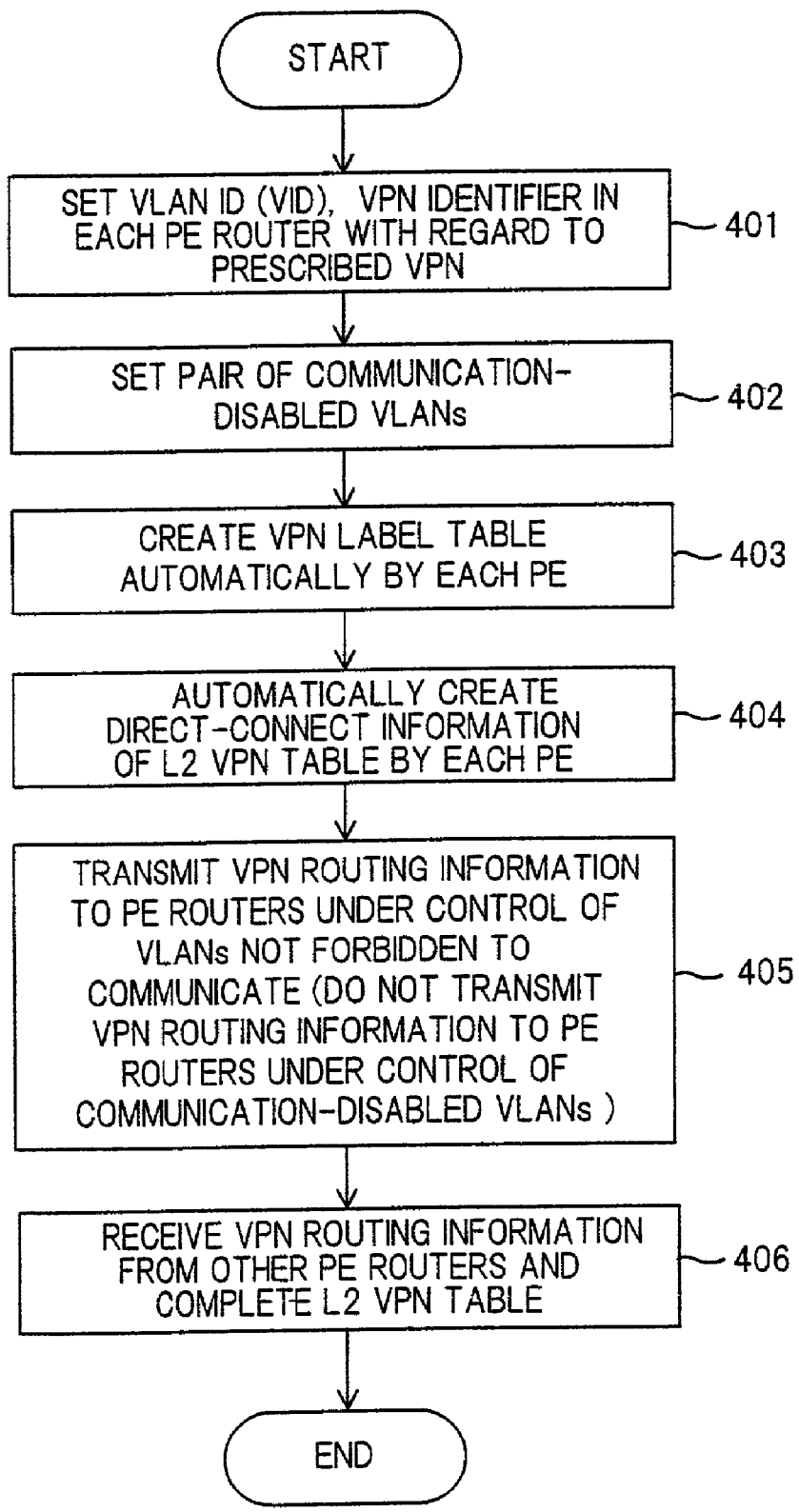
FIG. 16 is a flowchart of processing for creating a Level-2 VPN table in a case where a communication-disabled VLAN exists.

FIG. 16 is a flowchart illustrating processing for creating the L2 VPN routing table 125 in a case where communication-disabled VLANs exist.

In regard to a prescribed VPN, a VLAN ID (VID) and a VPN identifier (VPN label) are input to and set in each edge router PE (step 401). The pair of VLANs for which communication is to be disabled is then entered (step 402).

Each edge router PE creates the VPN label table 124 automatically (step 403) and then creates direct-connect information in the L2 VPN routing table 125 (step 404).

Using IBGP, each router then transmits VPN routing information (the MAC address of the edge router CPE and the loopback address of the edge router) to edge routers PE under the control of VLANs whose communication is not disabled (step 405). VPN routing information is not transmitted to edge routers PE under the control of VLANs whose communication is disabled. Each edge router PE receives routing information sent from the other edge routers and creates the L2 VPN routing table 125 using this routing information (step 406). Thus, the MAC address of a router CPE whose communication is to be disabled and the address of the edge router to which this router CPE is connected will not be registered in the L2 VPN routing table 125 of the edge router PE. As a result, a forwarding label cannot be acquired and communication with the VLAN whose communication is to be disabled can no longer be carried out.

(J) VLAN User Priority and IP Precedence in MPLS

Figure 17A:
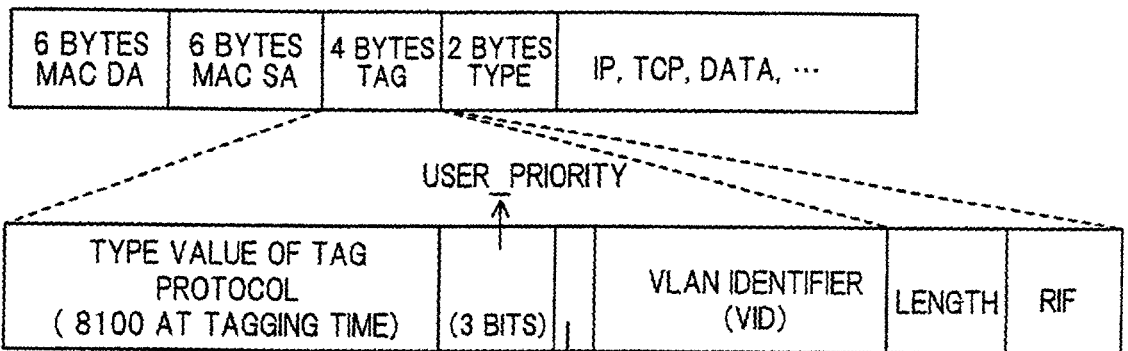
FIGS. 17A, 17B are diagrams useful in describing the correspondence between user priority in a VLAN and IP precedence in MPLS.

As shown in FIG. 17A, the tag of a VLAN packet includes 3-bit user priority and it is arranged so that the priority value stipulated by each MAC is entered using these three bits. A priority value can take on eight levels of 0 to 7. User priority is low if the value is small (e.g., 0) and high if the value is large.

Figure 17B:
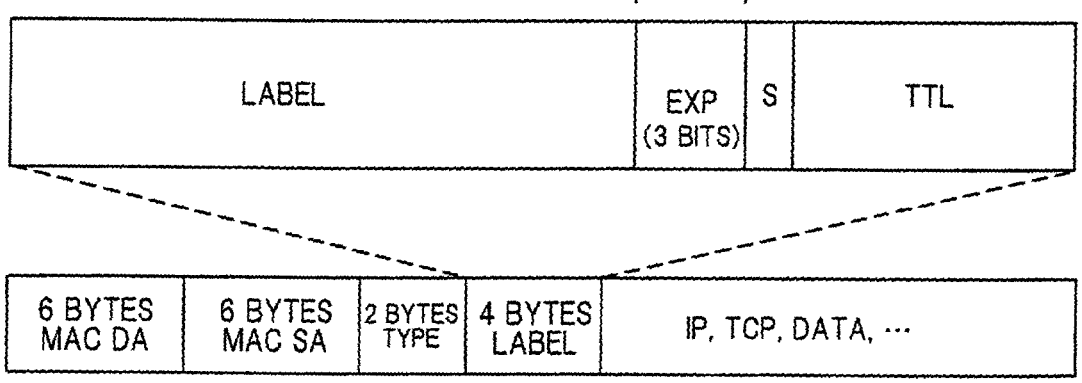
Figure 18:
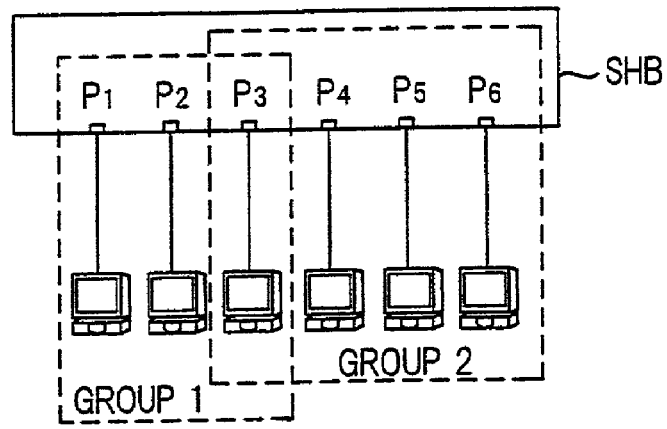
FIG. 18 is a diagram showing an example of the structure of a port-based VLAN according to the prior art.
Figure 19:
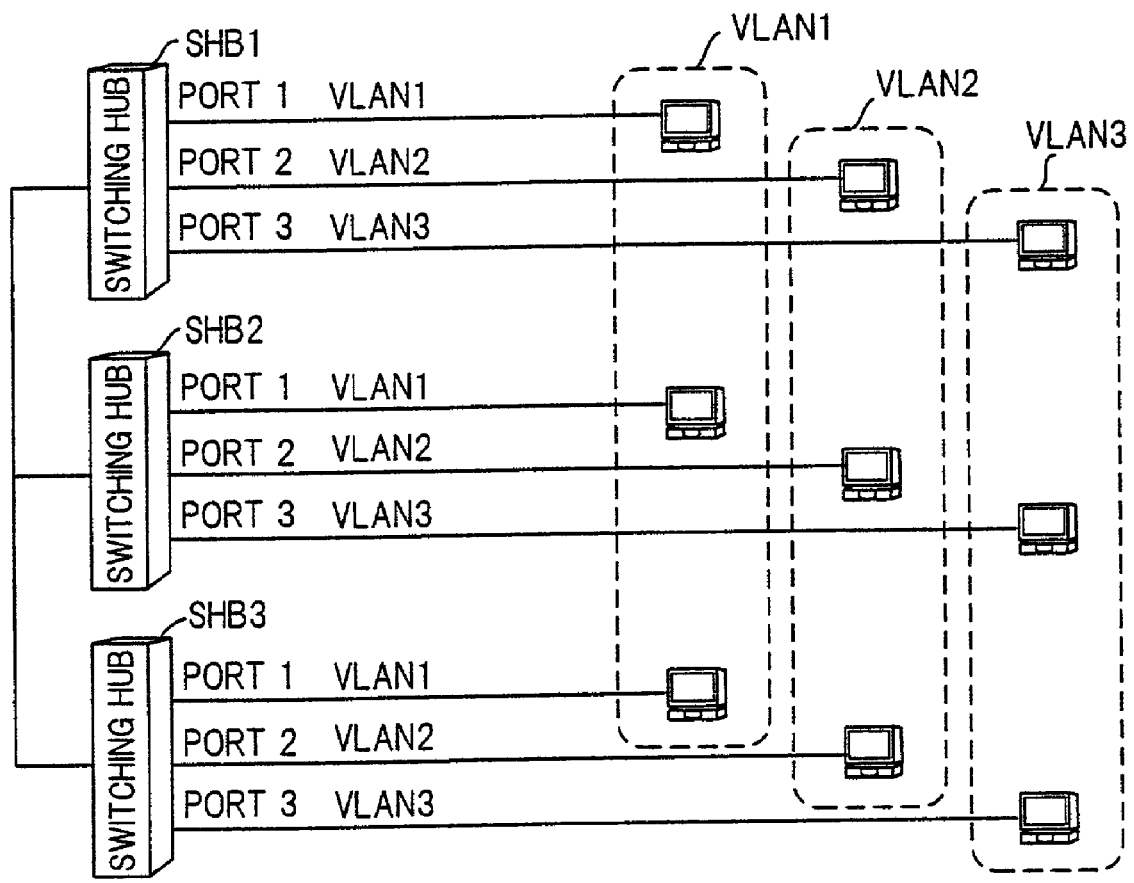
FIG. 19 is a diagram showing an example of an arrangement of VLANs in which ports belonging to a plurality of switching hubs have been grouped according to the prior art.

The label of an MPLS packet, on the other hand, includes a 3-bit experimental field EXP, as shown in FIG. 17B. IP precedence is expressed using these three bits. IP precedence also is a priority value that can take on eight levels of 0 to 7. Priority is low if the value is small (e.g., 0) and high if the value is large. Accordingly, when a conversion is made from a VLAN packet to an MPLS packet in an edge router, the 3-bit user priority is inserted into the EXP field. When a conversion is made from an MPLS packet to a VLAN packet, the IP precedence of the 3-bit EXP field is inserted into the user-priority field. If this expedient is adopted, priority control in a VLAN can be continued as IP precedence control in an MPLS network. Further, it is possible to return from IP precedence control to the original priority control in a VLAN.

Thus, in accordance with the present invention, the VPN identifier (VPN label) of an MPLS network can be expressed by 20 bits and the MPLS network is used in the core part of a carrier network. This makes it possible to set up many more VPNs in comparison with the VLAN-based construction method, thereby solving the problem of the upper limit (4096) on the number of VLAN-based VPNs. In addition, a highly scalable VPN can be provided.

Further, in accordance with the present invention, an access network is constructed by a VLAN-capable switching hub and a core network is constructed by MPLS-capable routers, thereby making it possible to construct an inexpensive VPN (a network having an L2-over-MPLS configuration). That is, according to the present invention, rather than placing a costly MPLS-capable router in a particular area, a VLAN-capable switching hub is used for accessing on a per-area basis and an MPLS-based VPN is constructed on a WAN between areas, thereby enabling the provision of a low-cost, highly scalable (expandable) VPN.

Further, in accordance with the present invention, an interface (edge router) is provided between a VLAN and an MPLS network. This enables the coexistence of VLANs and an MPLS network and facilitates movement from a VLAN to an MPLS network. In addition, it is possible to provide a low-cost, highly scalable VPN.

Further, in accordance with the present invention, it is possible to provide networking methods, techniques and products based upon integration of VLANs and MPLS. This facilitates the transition from an existing network incorporating a VLAN to an L2-over-MPLS network.

As many apparently widely different embodiments of the present invention can be made without departing from the spirit and scope thereof, it is to be understood that the invention is not limited to the specific embodiments thereof except as defined in the appended claims.

What is claimed is:

1. A network for forming a VPN on a shared network and communicating via the VPN, comprising:
   a core network of the VPN formed by an MPLS (Multi-Protocol Label Switch) network;
   access networks formed by VLANs to access said core newtwork; and
   edge routers provided at edges of the MPLS network for interfacing said MPLS network and the VLANs,
   wherein each of said edge routers includes
   a first table for storing correspondence between VLAN identifiers (VIDs) contained in VLAN packets and VPN labels contained in MPLS packets;
   a second table for storing correspondence between an address of each edge router which constructs said VPN and is connected to a VLAN, and an address of a VLAN-compatible device which constructs the VLAN and is connected to the edge router;
   means for finding a VPN label, which corresponds to a VLAN identifier (VID) of a VLAN packet, from said first table;
   a route decision unit for deciding a route which directs an MPLS packet to a receive-side edge router, and
   a third table for storing forwarding labels, which specify routes decided by said route decision unit, mapped to addresses of receive-side edge routers;
   means for finding a receive-side edge router corresponding to a destination of a packet from the second table based upon the destination address of a VLAN-compatible device contained in the VLAN packet and finding a forwarding label, which corresponds to the receive-side edge router, from said third table;
   a MPLS packet generation means for generating an MPLS packet that contains said VPN label and said forwarding label and sending this MPLS packet to the MPLS network; and
   means for finding a VID, which corresponds to a VPN label contained in an MPLS packet received from the MPLS network, from said first table, generating a VLAN packet having this VID and sending this VLAN packet to a VLAN indicated by this VID.

2. The network according to claim 1, wherein an edge router which constructs the VPN and is connected to a VLAN sends another edge router an address set composed of an address of a VLAN-compatible device connected to the first-mentioned edge router and the address of this edge router, and each edge router creates said second table based upon the received information; and
   said transmit-side edge router finds a receive-side edge router, which corresponds to the destination of the packet, front said second table.

3. The network according to claim 2, wherein an edge router transmits no address information to an edge router to which is connected a VLAN that has been prohibited from communicating.

4. The network according to claim 1, wherein said transmit-side edge router discards a VLAN packet having a VID value that is greater than a set value.

5. A network for forming a VPN on a shared network and communicating via the VPN according to claim 1,
   wherein a transmit-side edge router inserts user priority information, which is contained in a tag of a VLAN packer, into a label of an MPLS network, and a receive-side edge router inserts IP precedence information, which is contained in the label of an MPLS packet, into the sag of a VLAN packet as user priority information of the VLAN.

6. An edge router in a network for forming a VPN on a shared network, forming a core network of the VPN by an MPLS network and forming an access network, which is for accessing the core network, by a VLAN, comprising:
   a first table for storing correspondence between VLAN identifiers (VIDs) contained in VLAN packets and VPN labels contained in MPLS packets;
   a second table for storing correspondence between an address of each edge router which constructs said VPN and is connected to a VLAN, and address of a VLAN-compatible device which constructs the VLAN and is connected to the edge router,
   means for finding a VPN label, which corresponds to a VLAN identifier (VID) of a VLAN packet, from said first table;
   a route decision unit for deciding a route which directs an MPLS packet to a receive-side edge router; and
   a third table for storing forwarding labels, which specify routes decided by said route decision unit, mapped to addresses of receive-side edge routers;
   means for finding a receive-side edge router corresponding to a destination of a packet from the second table based upon the destination address of a VLAN-compatible device contained in the VLAN packet and finding a forwarding label, which corresponds to the receive-side edge router, from said third table;
   an MPLS packet generating unit for generating an MPLS packet that includes said VPN label and said forwarding label and sending this MPLS packet to the MPLS network; and
   means for finding a VID, which corresponds to a VPN label contained in an MPLS packet received from the MPLS network, from said first table, generating a VLAN packet having this VID and sending this VLAN packet to a VLAN indicated by this VID.

7. The edge router according to claim 6, wherein said MPLS packet generating unit receives from edge routers which are connected to other VLANs constituting said VPN, information comprising a combination of addresses of these edge routers and addresses of VLAN-compatible devices connected to these edge routers, creates said second table based upon said received information and finds said receive-side edge router, which corresponds to the destination of the packet, from said second table.

* * * * *